(12) United States Patent
Fukumoto

(10) Patent No.: US 8,761,571 B2
(45) Date of Patent: Jun. 24, 2014

(54) REPRODUCTION APPARATUS, MODE SETTING APPARATUS AND REPRODUCTION METHOD

(71) Applicant: JVC KENWOOD Corporation, Yokohama (JP)

(72) Inventor: Akihiro Fukumoto, Yokohama (JP)

(73) Assignee: JVC KENWOOD Corporation, Kanagawa-Ken (JP)

( * ) Notice: Subject to any disclaimer, the term of this patent is extended or adjusted under 35 U.S.C. 154(b) by 0 days.

(21) Appl. No.: 13/726,762

(22) Filed: Dec. 26, 2012

(65) Prior Publication Data

US 2013/0163946 A1 Jun. 27, 2013

(30) Foreign Application Priority Data

Dec. 26, 2011 (JP) ................. 2011-284527

(51) Int. Cl.
*H04N 5/77* (2006.01)
(52) U.S. Cl.
USPC .......................................... 386/224; 386/353
(58) Field of Classification Search
USPC ................................. 386/224, 248
See application file for complete search history.

(56) References Cited

U.S. PATENT DOCUMENTS

| | | | | |
|---|---|---|---|---|
| 5,754,430 A | * | 5/1998 | Sawada | ........................ 701/428 |
| 2003/0007227 A1 | | 1/2003 | Ogino | |
| 2005/0288860 A1 | * | 12/2005 | Pair et al. | ........................ 701/213 |
| 2007/0286584 A1 | * | 12/2007 | Yukimatsu | ................... 386/124 |
| 2010/0171829 A1 | * | 7/2010 | Yago et al. | ..................... 348/143 |
| 2011/0215995 A1 | * | 9/2011 | Shigeta et al. | ................ 345/156 |
| 2012/0077589 A1 | * | 3/2012 | Takehiro | ......................... 463/31 |

FOREIGN PATENT DOCUMENTS

| | | |
|---|---|---|
| JP | 2000-335318 A | 12/2000 |
| JP | 2005-167880 A | 6/2005 |
| JP | 2006-140976 A | 6/2006 |
| JP | 2007-335006 A | 12/2007 |
| JP | 2010-146695 | 7/2010 |

OTHER PUBLICATIONS

European Search Report (Application No. 12199193.9) (7 pages—dated Apr. 18, 2013).

* cited by examiner

*Primary Examiner* — Thai Tran
*Assistant Examiner* — Nien-Ru Yang
(74) *Attorney, Agent, or Firm* — Renner, Kenner, Greive, Bobak, Taylor & Weber

(57) ABSTRACT

First position information indicating a position is acquired at a first time. Second position information indicating a position is acquired at a second time that is later than the first time. The first position information and the second position information are compared to determine whether or not a reproduction apparatus is moved. Information is stored in a recording medium in a first mode if it is determined that the reproduction apparatus is moved and the information is stored in the recording medium in a second mode different from the first mode if it is determined that the reproduction apparatus is not moved. The first mode is a reproduction mode having functions for use in reproduction more restricted than the second mode.

16 Claims, 16 Drawing Sheets

REPRODUCTION APPARATUS, MODE SETTING APPARATUS AND REPRODUCTION METHOD

CROSS-REFERENCE TO RELATED APPLICATIONS

This application is based on and claims the benefit of priority from the prior Japanese Patent Application No. 2011-284527 filed on Dec. 26, 2011, the entire contents of which is incorporated herein by reference.

BACKGROUND OF THE INVENTION

The present invention relates to a reproduction apparatus, a mode setting apparatus, and a reproduction method.

There are various types of reproduction apparatuses for reproducing content data stored on an optical storage medium, such as a BD (Blu-ray Disc), a DVD (Digital Versatile Disc), and a CD (Compact Disc), and of recording apparatuses for recording content data on such storage media.

Moreover, there are various standards (profiles) for those optical storage media, such as Profile 1.1, Profile 2.0 and Profile 5.0, as standards of BDs. Profile 1.1 offers a function named as Picture-in-Picture and a function named as Bonus View including Virtual Package. Profile 2.2 offers functions named as BD-J Network Access (Blu-ray Disc Java, a registered trademark) and BD-Live including Progressive Playlist. Profile 5.0 offers functions called Stereoscopic 3D. In addition to these standards, new standards are introduced according to need.

The standards listed above are defined for BDs, not for reproduction and recording apparatuses therefor. Therefore, these BD reproduction and recording apparatuses are produced so as to be compatible with the standards listed above irrespective of the use of these apparatuses.

However, BD profiles listed above include functions unsuitable depending on the use of BD reproduction or recording apparatuses, or functions not so used often. For example, in the case of in-vehicle BD reproduction apparatuses, in general, these in-vehicle apparatuses are equipped with a display screen smaller than home-use apparatuses. Therefore, for example, when content data is reproduced by those in-vehicle apparatuses by using Picture-in-Picture, it may happen that characters and images cannot be fully displayed on the small screen, so that a user cannot recognize the characters and images.

SUMMARY OF THE INVENTION

A purpose of the present invention is to provide a reproduction apparatus, a mode setting apparatus, and a reproduction method, capable of determining the use thereof.

The present invention provides a reproduction apparatus comprising: a position-information acquisition unit configured to acquire first position information indicating a position at a first time and second position information indicating a position at a second time that is later than the first time; a movement determination unit configured to compare the first position information and the second position information to determine whether or not the reproduction apparatus is moved; and a reproduction unit configured to reproduce information stored in a recording medium in a first mode if it is determined that the reproduction apparatus is moved and to reproduce the information stored in the recording medium in a second mode different from the first mode if it is determined that the reproduction apparatus is not moved, the first mode being a reproduction mode having functions for use in reproduction more restricted than the second mode.

Moreover, the present invention provides a mode setting apparatus comprising: a storage unit configured to store mode definition information that defines a first mode and a second mode that has more functions than the first mode, as a control mode; a position-information acquisition unit configured to acquire first position information indicating a position at a first time and second position information indicating a position at a second time that is later than the first time; and a mode setting unit configured to set the first mode or the second mode as the control mode based on determination using the first and second position information.

Furthermore, the present invention provides a reproduction method to be used for a reproduction apparatus comprising the steps of: acquiring first position information indicating a position at a first time and second position information indicating a position at a second time that is later than the first time; comparing the first position information and the second position information to determine whether or not the reproduction apparatus is moved; and reproducing information stored in a recording medium in a first mode if it is determined that the reproduction apparatus is moved and reproducing the information stored in the recording medium in a second mode different from the first mode if it is determined that the reproduction apparatus is not moved, the first mode being a reproduction mode having functions for use in reproduction more restricted than the second mode.

DETAILED DESCRIPTION OF PREFERRED EMBODIMENTS

Embodiments of a reproduction apparatus, a mode setting apparatus, and a reproduction method will be explained with reference to the attached drawings. Throughout the drawings, the components of various apparatuses and steps of various processes that are analogous to or the same as each other are given the same numeral or reference signs and the repeated explanation thereof is omitted for brevity.

(First Embodiment)

A reproduction apparatus (as an output apparatus) will be explained with reference to the drawings according to a first embodiment of the present invention.

A reproduction apparatus 100 according to the first embodiment is an apparatus for reproducing (outputting) content data stored on a BD (Blu-ray Disc) as a storage medium. The reproduction apparatus 100 determines its use based on whether or not it has been moved for a predetermined period of time and then reproduces content from a BD with a reproduction method (output mode or reproduction mode) in accordance with the determined use.

As for the use of the reproduction apparatus 100, there are a stationary use (a second use mode) and a portable use (a first use mode), for example. The stationary use is, for example, use of the reproduction apparatus 100 as a stay-at-home model. The portable use is, for example, use of the reproduction apparatus 100 as a BD reproduction apparatus incorporated in an automotive navigation system, a portable BD reproduction apparatus, etc.

A fully compatible mode is preset as an output mode (a second reproduction mode) suitable for the stationary use. In this invention, the fully compatible mode is defined as an output mode compatible, for example, with major BD standards (for example, Profile 1.1, Profile 2.0 and Profile 5.0). A simple mode is also preset as an output mode (a first reproduction mode) suitable for the portable use. In this invention, the simple mode is defined as an output mode compatible, for example, with major BD standards (for example, Profile 1.1, Profile 2.0 and Profile 5.0), with Picture-in-Picture and Bonus View including Virtual Package omitted among the functions offered by the major BD standards. The output mode suitable for the stationary use can be freely determined depending on the functions compatible with the standards of storage media or the like. The output mode suitable for the portable use can also be freely determined as long as the functions for this mode is more restricted than the output mode suitable for the stationary use.

A BD as the storage medium in this invention is one example of optical discs including a DVD (Digital Versatile Disc), a CD (Compact Disc), etc. The storage medium in this invention includes a flash memory, an HDD (Hard Disc Drive), etc., besides an optical disc. The content data in this invention may include one of or a combination of a moving picture, a still image, a voice, etc. In this embodiment, the content data includes a moving picture and a voice.

Figure 1:
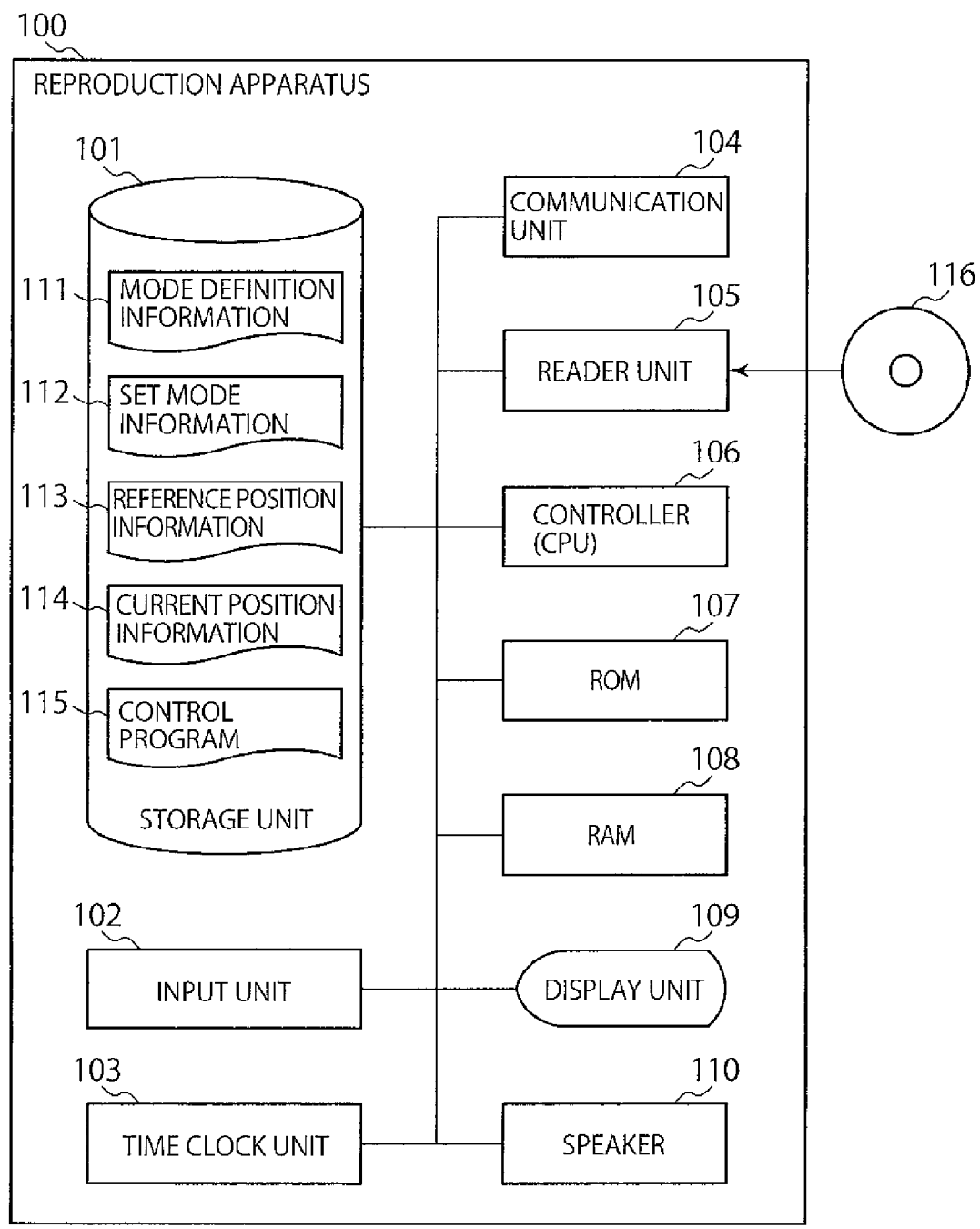
FIG. 1 shows a block diagram of a reproduction apparatus according to a first embodiment of the present invention.

FIG. 1 shows a block diagram of the reproduction apparatus 100 of the first embodiment. As shown in FIG. 1, the reproduction apparatus 100 is provided a storage unit 101, an input unit 102, a time clock unit 103, a communication unit 104, a reader unit 105, a controller 106, a ROM (Read Only Memory) 107, a RAM (Random Access Memory) 108, a display unit 109, and a speaker 110. As will be explained later, the controller 106 may be configured with a CPU (Central Processing Unit).

The storage unit 101 that is a storage medium, such as an HDD and a flash memory, for storing mode definition information 111, set mode information 112, reference position information 113, current position information 114, and a control program 115.

The mode definition information 111 defines a reproduction mode (output mode or reproduction mode) depending on the use of the reproduction apparatus 100. The mode definition information 111 is set by a user, a manufacturer, etc. Information set as the mode definition information 111 in this embodiment are: the information indicating that an output mode suitable for the stationary use is the fully compatible mode (a second mode as a control mode, having more functions than a first mode mentioned below) and the description of the fully compatible mode; and the information indicating that an output mode suitable for the portable use is the simple mode (the first mode as a control mode) and the description of the simple mode.

The set mode information 112 indicates an output mode. The output mode is set in the set mode information 112 by the reproduction apparatus 100. The output mode to be set is either the fully compatible mode or the simple mode depending on the use of the reproduction apparatus 100 determined by itself which will be explained later.

The reference position information (first position information) 113 is information composed of data of the reference position of the reproduction apparatus 100 and data of time (the reference position-set date and/or time at which that the reference position is located) at which the reference position is set, the data being linked together.

The current position information (second position information) 114 is information composed of data of the current position of the reproduction apparatus 100 and data of the time (reference position-located date and/or time) at which the current position is located.

The control program 115 is a software program including a mode setting module and an output control module, for controlling the reproduction apparatus 100. The mode setting module is a software program for determining the use of the reproduction apparatus 100 based on whether or not the reproduction apparatus 100 has been moved for a predetermined period of time and for setting an output mode compatible with the determined use in the reproduction apparatus 100. The output control module is a software program for outputting content data stored on a BD 116 in an output mode set in the reproduction apparatus 100.

Part of or all of the mode definition information 111, the set mode information 112, the reference position information 113, the current position information 114, and the control program 115 stored in the storage unit 101 may be stored in the ROM 107.

The input unit 102 that is configured, for example, with various types of buttons, switches, etc. to be operated by a user, outputs information depending on a user operation. For example, the input unit 102 includes a main power button, an auxiliary power button, an output start button, and an output halt button (all buttons not shown). The input unit 102 may be a touch panel or an operation window that is displayed on the display unit 109 by executing a software program, with images of the main power button, the auxiliary power button, the output start button, and the output halt button being displayed on the operation window.

The main power button is used for switching between power-on and power-off of the reproduction apparatus 100. The auxiliary power button (power turn-on means) is used for switching between a waiting mode in which power has been just turned on so that the reproduction apparatus 100 is in a waiting state and a power turned-on mode in which power has been on so that the reproduction apparatus 100 can perform various processes. When the auxiliary power button is depressed while power is on by the main power button, the input unit 102 outputs auxiliary power-switching information that indicates that the mode is switched between the waiting mode and the power turned-on mode. The reproduction apparatus 100 may be provided with one power button for switching between a power turned-off mode and a power turned-on mode in which power has been on so that the reproduction apparatus 100 can perform various processes. The output start button is used for starting a process (an output process) of reproducing content data stored on the BD 116. When the output start button is depressed while the reproduction apparatus 100 is being in the power turned-on mode so that it can perform various processes, the input unit 102 outputs output start information. The output halt button is used for halting the output process. When the output halt button is depressed while the output process is being executed, the input unit 102 outputs output halt information.

The time clock unit 103 is made up of, for example, a chip with a quartz resonator or the like incorporated therein, for time measurements. The time clock unit 103 outputs current time information that indicates the current time.

The communication unit 104 is a communication interface that communicates with terminal equipment (not shown) in wired or wireless communication when it receives a request from the controller 106, for example. The terminal equipment in this embodiment has a function of acquiring information indicating its position and transmitting this information to the reproduction apparatus 100. The terminal equipment in this embodiment is, for example, a mobile phone, a smartphone, a tablet PC (Personal Computer), or a digital camera having a GPS function, carried by a user of the reproduction apparatus 100.

The terminal equipment in this embodiment may acquire information indicating its position using a wireless communication system. The information indicating the position of the terminal equipment may be: information that indicates latitude and longitude acquired through a GPS (Global Positioning System); information that indicates the position of a base station or the orbit of a satellite used in a communication network for mobile phones; or information composed of data of a MAC (Media Access Control) address of a Wi-Fi (a registered trademark) access point and data of the position of the access point, linked together.

While a user is using the reproduction apparatus 100, the terminal equipment is carried by the user to move with the reproduction apparatus 100 within a range of distance in which the terminal equipment can communicate with the reproduction apparatus 100, preferably, within a range of several meters.

The reader unit 105 that is constituted, for example, by a light emitting element, a lens, a motor, a light receiving element, etc., reads data stored on the BD 116 and outputs a servo signal. The servo signal may be one of or more of a tacking error (TE) signal, a focus error (FE) signal, and a high frequency (RF) signal while content data is being output.

When the controller 106 is configured with a CPU, the CPU executes the control program 115 while it is retrieving information stored in the storage unit 101, the ROM 107 and the RAM 108 for the entire control of the reproduction apparatus 100. The ROM 107 is a readable storage medium, for example, an EPROM (Erasable Programmable Read Only Memory), that stores various information such as a software program. The RAM 108 is a readable and writable storage medium that functions as a working area for the controller 106.

The display unit 109 is, for example, a liquid crystal panel for displaying images. The speaker 110 gives of sounds.

Figure 2:
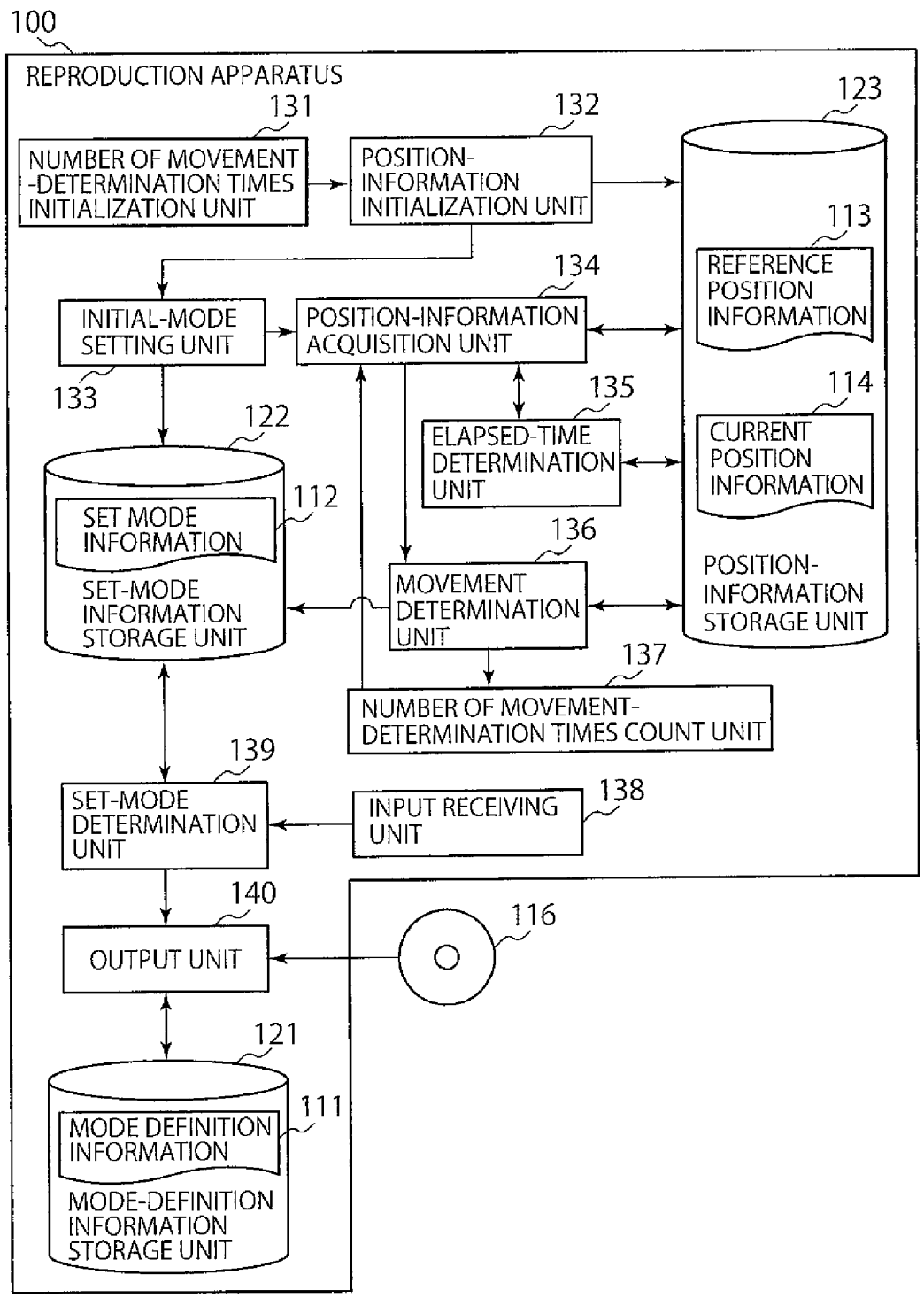
FIG. 2 shows a detailed block diagram of the reproduction apparatus according to the first embodiment.

FIG. 2 shows a detailed block diagram of the reproduction apparatus 100 of the first embodiment. In FIG. 1, when the controller 106 is configured with a CPU, the CPU cooperates with the storage unit 101, the input unit 102, the time clock unit 103, the communication unit 104, the reader unit 105, the ROM 107, the RAM 108, the display unit 109, and the speaker 110, to execute the control program 115 to achieve various functions corresponding to the various units shown in FIG. 2.

In FIG. 2, the reproduction apparatus 100 is provided with a mode-definition information storage unit 121, a set-mode information storage unit 122, a position-information storage unit 123, a number of movement-determination times initialization unit 131, a position-information initialization unit 132, an initial-mode setting unit 133, a position-information acquisition unit 134, an elapsed-time determination unit 135, a movement determination unit 136, a number of movement-determination times count unit 137, an input receiving unit 138, a set-mode determination unit 139, and an output unit 140.

The mode-definition information storage unit 121 stores the mode definition information 111. The set-mode information storage unit 122 stores the set mode information 112. The position-information storage unit 123 stores the reference position information 113 and the current position information 114. When the controller 106 is configured with a CPU, several storages areas of the storage unit 101 (FIG. 1) that store the mode definition information 111, the set mode information 112, the reference position information 113, and the current position information 114 are used as the mode-definition information storage unit 121, the set-mode information storage unit 122, and the position-information storage unit 123.

The number of movement-determination times initialization unit 131 obtains a storage area in, for example, the RAM 108, for storing information indicating a number of movement determination times N determined by the movement determination unit 136 that determines whether or not the reproduction apparatus 100 has been moved by a user, which will be explained later. Then, the number of movement-determination times initialization unit 131 sets zero in the information indicating the number of movement determination times N. When the controller 106 is configured with a CPU, the function of the number of movement-determination times initialization unit 131 is achieved, for example, by cooperation of the CPU that executes the mode setting module included in the control program 115 and the RAM 108, and also the ROM 107 according to need.

The position-information initialization unit 132 clears the reference position information 113 and the current position information 114 stored in the position-information storage unit 123, which may be done by setting a specific initial value in the information 113 and 114, or deleting the information 113 and 114. When the controller 106 is configured with a CPU, the function of the position-information initialization unit 132 is achieved, for example, by cooperation of the CPU that executes the mode setting module included in the control program 115 and the RAM 108, and also the ROM 107 according to need.

The initial-mode setting unit 133 sets an initial value in the set mode information 112 stored in the set-mode information storage unit 122. In this embodiment, the simple mode is set in the set mode information 112, as the initial value. When the controller 106 is configured with a CPU, the function of the initial-mode setting unit 133 is achieved, for example, by cooperation of the CPU that executes the mode setting module included in the control program 115 and the RAM 108, and also the ROM 107 according to need.

The position-information acquisition unit 134 acquires information indicating the position of the terminal equipment (not shown) and, just after that, acquires current time information. Then, the position-information acquisition unit 134 creates position information by linking the acquired information indicating the position of the terminal equipment and current time information.

Thereafter, the position-information acquisition unit 134 looks up the position-information storage unit 123 to determine whether or not the reference position information 113 has been cleared. If it is determined that the reference position information 113 has been cleared, the position-information acquisition unit 134 stores the created position information in the position-information storage unit 123, as the reference position information 113. On the other hand, if it is determined that the reference position information 113 has not been cleared, that is, the reference position has already been set in the reference position information 113, the position-information acquisition unit 134 stores the created position information in the position-information storage unit 123, as the current position information 114.

When the controller 106 is configured with a CPU, the function of the position-information acquisition unit 134 is achieved, for example, by cooperation of the CPU that executes the mode setting module included in the control program 115, the time clock unit 103 and the communication unit 104. Moreover, the position-information acquisition unit 134 may be divided into a first position-information acquisition unit for acquiring the reference position information 113 (first position information indicating a position at a first time) and a second position-information acquisition unit for acquiring the current position information 114 (second position information indicating a position at a second time that is later than the first time).

The position of the terminal equipment that is carried by a user is actually different from the position of the reproduction apparatus 100. However, in this embodiment as described above, the position of the terminal equipment is treated as the position of the reproduction apparatus 100. Moreover, the time at which the position of the terminal equipment is located is actually different from the time (a position-located time) at which the position of the reproduction apparatus 100 is located. However, in this embodiment, the time at which the position of the terminal equipment is detected is treated as the position-located time.

As described above, a margin of error is allowed in this invention for the position and the position-located time of the reproduction apparatus 100. The amount of a margin of error is appropriately determined in accordance with, for example, the accuracy of location of the position of the reproduction apparatus 100, the accuracy of the position-located time, a period of time ($TH_1 \times N_0$ [sec] which will be explained later) for determination of whether or not the reproduction apparatus 100 has been moved, and a means of moving the reproduction apparatus 100, such as an automobile.

For example, when a user views or listens to content data stored on the BD 116, the user is not moving in most cases. Therefore, when the user uses the reproduction apparatus 100 for reproducing the BD 116, it is likely that the user is riding in a transportation means such as an automobile and a train. Under consideration of this user's action, in this embodiment, whether or not a user has moved with the reproduction apparatus 100 by means of an automobile, a train etc., is determined based on the change in the position of the reproduction apparatus 100 within a specific period of time in the range from several seconds to several minutes.

The margin of error for the position of the reproduction apparatus 100 is, for example, within a range shorter than a distance for which the reproduction apparatus 100 can be moved for a time obtained by deleting an error of the position-located time from the specific period of time discussed above. In this case, the margin of error for the position of the reproduction apparatus 100 is, for example, about several meters to several hundred meters and the margin of error for the position-located time is about several seconds to one minute.

Concerning the position of the reproduction apparatus 100, the elapsed-time determination unit 135 determines whether or not an elapsed time $TS_1$ from the most current position-located time included in the reference position information 113 or the current position information 114 has reached or has passed a predetermined threshold value $TH_1$ [sec].

In detail, when the position-information acquisition unit 134 creates position information, the elapsed-time determination unit 135 looks up the position-information storage unit 123 to acquire the position information created by the position-information acquisition unit 134. If the current position information 114 has been stored in the position-information storage unit 123, the elapsed-time determination unit 135 acquires the current position information 114. On the other hand, if the current position information 114 has not been stored in the position-information storage unit 123, the elapsed-time determination unit 135 acquires the reference position information 113.

Then, the elapsed-time determination unit 135 acquires current time information from the time clock unit 103 continuously or at a predetermined interval and calculates an elapsed time $TS_1$ of the current time indicated by the acquired current time information from a position-located time included in the acquired current position information 114 or the reference position information 113, thereby measuring an elapsed time TS1.

Thereafter, the elapsed-time determination unit 135 compares the measured elapsed time TS1 with the threshold value $TH_1$ [sec] to determine whether or not the elapsed time $TS_1$ has reached or has passed the threshold value $TH_1$ [sec]. If it is determined that the elapsed time $TS_1$ has reached or has passed the threshold value $TH_1$ [sec], the elapsed-time determination unit 135 outputs an instruction to the position-information acquisition unit 134 to create position information. On the other hand, if it is not determined that the elapsed time $TS_1$ has reached or has passed the threshold value $TH_1$ [sec], the elapsed-time determination unit 135 repeats the determination of whether or not the elapsed time $TS_1$ has reached or has passed the threshold value $TH_1$ [sec].

When the controller 106 is configured with a CPU, the function of the elapsed-time determination unit 135 is achieved, for example, by cooperation of the CPU that executes the mode setting module included in the control program 115, the time clock unit 103 and the RAM 108, and also the ROM 107 according to need.

When setting the current position information 114 by the position-information acquisition unit 134 is complete, the movement determination unit 136 acquires the set current position information 114 and the reference position information 113 from the position-information storage unit 123. Then, the movement determination unit 136 compares the current position information 114 and the reference position information 113 to determine whether or not the current position and the reference position indicated by the information 114 and the information 113, respectively, are equal to other. If it is determined that the current position and the reference position are equal to each other, this means that the reproduction apparatus 100 has not been moved. In this case, the movement determination unit 136 sets the fully compatible mode predetermined as an output mode suitable for the stationary use in the set mode information 112. On the other hand, if it is determined that the current position and the reference position are different from each other, this means that the reproduction apparatus 100 has been moved. In this case, the movement determination unit 136 sets the simple mode predetermined as an output mode suitable for the portable use in the set mode information 112.

In this output mode setting of this embodiment, the movement determination unit 136 sets an output mode in the set mode information 112 only when an output mode to be set based on the determination described above has not been set. In other words, the output mode setting of this embodiment by the movement determination unit 136 is not a process of always updating the set mode information 112 but a process of making the set mode information 112 in a state in which an output mode to be set based on the determination described above has been set.

When the controller 106 is configured with a CPU, the function of the movement determination unit 136 is achieved, for example, by cooperation of the CPU that executes the mode setting module included in the control program 115 and the RAM 108, and also the ROM 107 according to need.

The number of movement-determination times count unit 137 counts the number of movement-determination times N. When the controller 106 is configured with a CPU, the function of the number of movement-determination times count unit 137 is achieved, for example, by cooperation of the CPU that executes the mode setting module included in the control program 115 and the RAM 108, and also the ROM 107 according to need.

The input receiving unit 138 receives output start information or output complete information based on a user operation. When the controller 106 is configured with a CPU, the function of the input receiving unit 138 is achieved, for example, by cooperation of the input unit 102 and the CPU in the power turned-on mode in which power has been on so that the reproduction apparatus 100 can perform various processes.

When the input receiving unit 138 receives the output start information, the set-mode determination unit 139 looks up the set mode information 112 stored in the set-mode information storage unit 122 to determine whether the output mode set in the looked-up set mode information 112 is the fully compatible mode or the simple mode. When the controller 106 is configured with a CPU, the function of the set-mode determination unit 139 is achieved, for example, by cooperation of the CPU that executes the output control module included in the control program 115 and the RAM 108, and also the ROM 107 according to need.

The output unit 140 (a reproduction unit) outputs content data that has been stored on the BD 116 in the output mode set in the reproduction apparatus 100. In detail, the output unit 140 acquires information that indicates a result of determination described above from the set-mode determination unit 139 and then acquires the mode definition information 111 corresponding to the acquired information about determination, from the mode-definition information storage unit 121. Thereafter, in accordance with the output mode indicated by the acquired mode definition information 111, the output unit 140 reads content data from the BD 116, converts the content data into data that can be output from the display unit 109 and the speaker 110, and outputs converted data (image and audio data). When the controller 106 is configured with a CPU, the function of the output unit 140 is achieved, for example, by cooperation of the CPU that executes the output control module included in the control program 115, the reader unit 105, the display unit 109, the speaker 110, and the RAM 108, and also the ROM 107 according to need.

Described above is the configuration or the mechanism of the reproduction apparatus 100 in the first embodiment. Hereinbelow, various processes performed by the reproduction apparatus 100 in the first embodiment will be explained.

Figure 3:
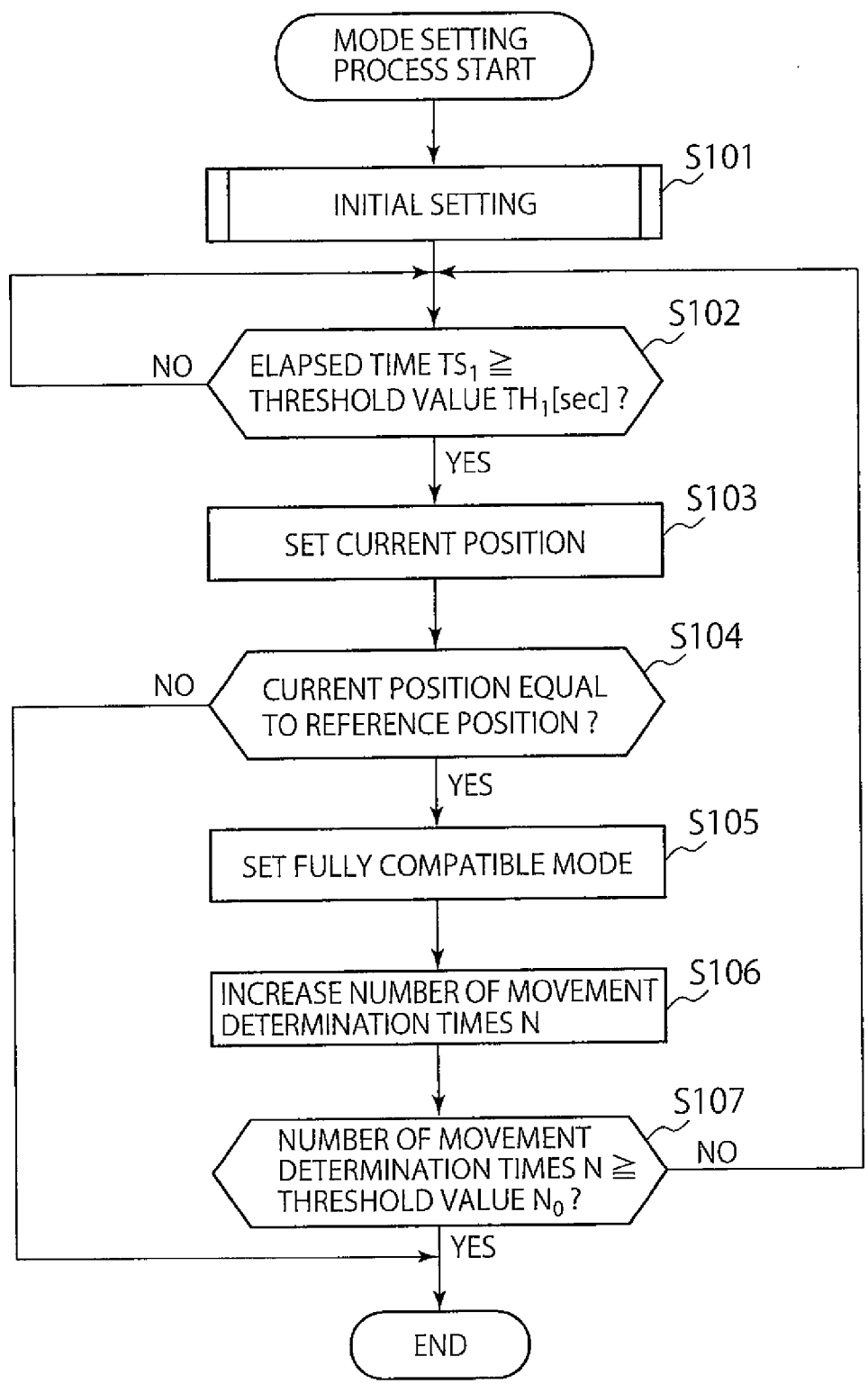
FIG. 3 is a flowchart showing a mode setting process performed by the reproduction apparatus according to the first embodiment.

The reproduction apparatus 100 starts a mode setting process shown in FIG. 3 whenever the auxiliary power button is depressed while power is being turned on with the main power button and the input unit 102 outputs the auxiliary power-switching information. When the controller 106 is configured with a CPU, for example, the CPU in a waiting mode receives the auxiliary power switching information to execute the mode setting module included in the control program 115, thereby starting the mode setting process shown in FIG. 3.

As shown in FIG. 3, when the mode setting process starts, the reproduction apparatus 100 performs an initial setting process (step S101) for initializing various parameters. The detail of the initial setting process (step S101) in this embodiment is shown in FIG. 4.

Figure 4:
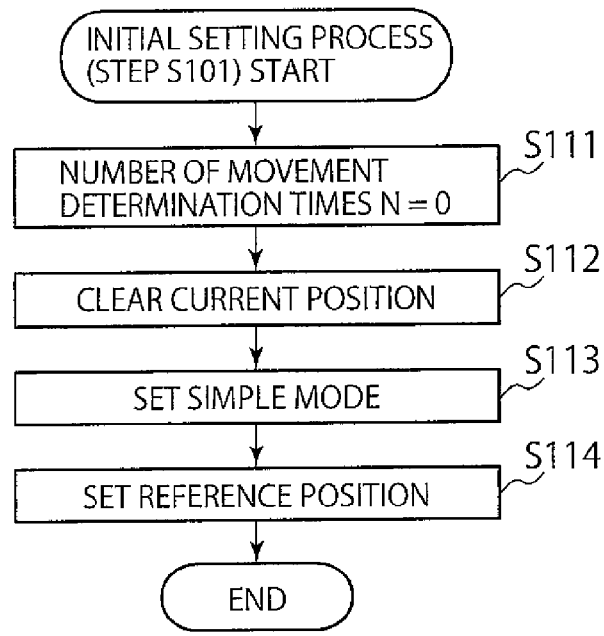
FIG. 4 is a flowchart showing an initial setting process performed by the reproduction apparatus according to the first embodiment.

As shown in FIG. 4, when the initial setting process (step S101) starts, the number of movement-determination times initialization unit 131 sets zero (N=0) in number of movement-determination times information that indicates the number of movement-determination times N (step S111). Next, the position-information initialization unit 132 clears the position information (the reference position 113 and the current position information 114) stored in the position-information storage unit 123 (step S112). Then, the initial-mode setting unit 133 sets the simple mode, as an initial value, in the set mode information 112 (step S113). Thereafter, the position-information acquisition unit 134 sets the reference position of the reproduction apparatus 100 in the reference position information 113 (step S114) and the process ends.

In detail, in the initial setting process shown in FIG. 4, the position-information acquisition unit 134 acquires information indicating a position of the terminal equipment from the terminal equipment and also acquires current time information from the time clock unit 103. Then, the position-information acquisition unit 134 creates position information by linking the information indicating position of the terminal equipment and the current time information. Thereafter, since the reference position information 113 in the position-information storage unit 123 has been cleared, the position-information acquisition unit 134 stores the created position information in the position-information storage unit 123, as the reference position information 113.

Returning to FIG. 3, following to the initial setting process (step S101), the elapsed-time determination unit 135 determines whether or not the elapsed time $TS_1$ has reached or has passed the predetermined threshold value $TH_1$ [sec] (step S102). In detail, on receiving an instruction from the position-information acquisition unit 134, the elapsed-time determination unit 135 looks up the reference position information 113 or the current position information 114 stored in the position-information storage unit 123. In this step, since the current position information 114 has been cleared in the position-information clear step S112 (FIG. 4), the elapsed-time determination unit 135 looks up the reference position information 113. Then, the elapsed-time determination unit 135 acquires current time information from the time clock unit 103 continuously or at a predetermined interval and calculates an elapsed time $TS_1$ that is the difference between a time included in the looked-up reference position information 113 and a time indicated by the acquired current time information. Thereafter, the elapsed-time determination unit 135 compares the calculated elapsed time $TS_1$ and the threshold value $TH_1$ [sec] to determine whether the elapsed time $TS_1$ has reached or has passed the threshold value $TH_1$ [sec].

If it is determined that the elapsed time $TS_1$ has not reached or passed the threshold value $TH_1$ [sec] (No in step S102), the elapsed-time determination unit 135 repeats the elapsed-time determination step (step S102). On the other hand, if it is determined that the elapsed time $TS_1$ has reached or has passed the threshold value $TH_1$ [sec] (Yes in step S102), the position-information acquisition unit 134 receives an instruction from the elapsed-time determination unit 135 to set the current position of the reproduction apparatus 100 in the current position information 114 (step S103).

In detail, if Yes in step S102, on receiving an instruction from the elapsed-time determination unit 135, the position-information acquisition unit 134 acquires information indicating a position of the terminal equipment from the terminal equipment and then acquires current time information from the time clock unit 103. Then, the position-information acquisition unit 134 creates position information by linking the information indicating the position of the terminal equipment and the current time information. Since, the reference position has already been set in the reference position information 113 in the position-information storage unit 123, the position-information acquisition unit 134 sets the created position information in the position-information storage unit 123, as the current position information 114. In this way, the position-information acquisition unit 134 sets the current position of the reproducing apparatus 100 in the current position information 114.

Following to the step S103, the movement determination unit 136 acquires the reference position information 113 and the current position information 114 stored in the position-information storage unit 123, and determines whether or not the current position and the reference position indicated by the information 114 and the information 113, respectively, are equal to each other (step S104).

The determination of whether or not the current position and the reference position are equal to each other may be performed with a predetermined margin of error. For example, it may be determined that the current position and the reference position are equal to each other if a difference between the reference position and the current position is within a predetermined range. On the other hand, it may be determined that the current position and the reference position are different from each other if a difference between the reference position and the current position is beyond the predetermined range.

In detail, a position may be given in latitude and longitude. In this case, the reference position and the current position may be given in reference latitude and reference longitude, and in current latitude and current longitude, respectively. Moreover, in this case, it may be determined that the current position and the reference position are equal to each other if the absolute value of a difference between the reference latitude and the current latitude is equal to or smaller than a threshold value and if the absolute value of a difference between the reference longitude and the current longitude is equal to or smaller than a threshold value. On the other hand, it may be determined that the current position and the reference position are different from each other if the absolute value mentioned above is larger than the threshold value for at least one of the latitude and longitude. Moreover, it may be determined that the current position and the reference position are equal to each other if a value obtained with an expression $((\text{reference latitude}-\text{current latitude})^2+(\text{reference longitude}-\text{current longitude})^2)^{(1/2)}$ or a distance between the reference position and the current position is equal to or smaller than a threshold value. On the other hand, it may be determined that the current position and the reference position are different from each other if the value or distance mentioned above is larger than the threshold value.

If it is determined that the current position and the reference position are different from each other, that is, the reproduction apparatus 100 has been moved (No in step S104), the mode setting process ends. In this case, the movement determination unit 136 does not change the set mode in the set mode information 112 so that the simple mode set in the initial mode setting process (step S101) remains unchanged. In this way, the movement determination unit 136 sets the simple mode in the set mode information 112.

On the other hand, if it is determined that the current position and the reference position are equal to each other, that is, the reproduction apparatus 100 has not been moved (Yes in step S104), the movement determination unit 136 sets the fully compatible mode in the set mode information 112 (step S105). Then, the number of movement-determination times count unit 137 receives an instruction from the movement determination unit 136 to increase the number of movement-determination times N, that is, adds 1 to the number of movement-determination times N (step S106), thereby the number of movement-determination times N is increased from zero (set in step S111 of FIG. 4) to 1.

Next, the number of movement-determination times count unit 137 determines whether or not the increased number of movement-determination times N is equal to or larger than a predetermined threshold value $N_0$ that is set to 2 in this embodiment (step S107). Since the number of movement-determination times N is 1, it is determined that the number of movement-determination times N is smaller than the threshold value $N_0$ (No in step S107). The threshold value $N_0$ may be any value (a natural number). If the threshold value $N_0$ is set to 3 or larger, the steps S102 to S106 are repeated. Therefore, a predetermined period of time for determining whether or not the reproduction apparatus 100 has been moved is obtained by multiplying the threshold value $Th_1$ [sec] and the threshold value $N_0$ [number].

If it is determined that the number of movement-determination times N is smaller than the threshold value $N_0$ (No in step S107), the elapsed-time determination unit 135 receives an instruction from the number of movement-determination times count unit 137 to perform the elapsed-time determination step (step S102).

If it is determined that the elapsed time $TS_1$ has reached or has passed the threshold value $TH_1$ [sec] (Yes in step S102), the position-information acquisition unit 134 creates position information, as described in step S103. In the case described above, the reference position and the current position have already been set in the reference position information 113 and the current position information 114, respectively, of the position-information storage unit 123. Therefore, the position-information acquisition unit 134 overwrites the current position information 114 with the created position information in the current-position setting step S103.

Following to the step S103, the movement determination unit 136 performs the movement determination step (step S104). If it is determined that the current position and the reference position are different from each other (No in step S104), the mode setting process ends.

On the other hand, if it is determined that the current position and the reference position are equal to each other (Yes in step S104), the movement determination unit 136 sets the fully compatible mode in the set mode information 112 (step S105). Then, the number of movement-determination times count unit 137 increases the number of movement-determination times N (step S106), thereby the number of movement-determination times N is increased to 2. Next, the number of movement-determination times count unit 137 performs the number of movement-determination times determination step (step S107). Since the number of movement-determination times N is 2, it is determined that the number of movement-determination times N is equal to the threshold value $N_0$ of 2 (Yes in step S107) and the mode setting process ends.

As described above, in the mode setting process in the first embodiment, it is determined whether or not the reference position of the reproduction apparatus 100 and a position of the reproduction apparatus 100 at a time that has reached or has passed the threshold value $Th_1$ [sec] after the setting of the reference position, are equal to each other. In this way, it is determined whether or not the reproduction apparatus 100 has been moved at least within the threshold value $Th_1$ [sec]. It can be considered that when the reproduction apparatus 100 is moved, it is for the portable use, whereas when the reproduction apparatus 100 is not moved, it is for the stationary use. Therefore, by executing the mode setting process shown in FIG. 3, it can be automatically determined that whether the reproduction apparatus 100 is for the portable use or the stationary use. Moreover, in the mode setting process shown in FIG. 3, the output mode automatically determined as described above is set in the reproduction apparatus 100, so that a user does not need to set an output mode.

As described above, according to the first embodiment, if it is determined that the current position and the reference position are equal to each other, that is, the reproduction apparatus 100 has not been moved, in all $N_0$ (the threshold value for use in determination of the number of movement-determination times in step S107) times of movement determination steps S104, the fully compatible mode is set in the set mode information 112, in the mode setting process shown in FIG. 3. On the other hand, if it is determined that the current position and the reference position are different from each other, that is, the reproduction apparatus 100 has been moved, even only once in all $N_0$ times of movement determination steps S104, the simple mode is set in the set mode information 112.

For use in the fully compatible mode, it may be required to install firmware often delivered in the reproduction apparatus 100 and the reproduction apparatus 100 is configured with high-performance hardware, otherwise reproduction of the BD 116 is impossible. On the contrary, for use in the simple mode, since the compatible functions are restricted compared to the fully compatible mode, the reproduction apparatus 100 can reproduce the BD 116 in more cases than the fully compatible mode, even if the firmware is not updated or the performance of hardware is not so high.

Accordingly, by setting the simple mode in the set mode information 112 if it is determined that the reproduction apparatus 100 has been moved, even only once in all $N_0$ times of movement determination steps S104, it is avoided that the BD 116 cannot be reproduced. With this mode setting, even a BD in conformity with new standards which will be established in the future can be reproduced in many occasions, hence compatibility in reproduction can be maintained.

Next, an output process to be performed by the reproduction apparatus 100 will be explained with respect to FIG. 5. The output process starts when the output start button (not shown) is depressed while the reproduction apparatus 100 is in the power turned-on mode in which power has been on so that the reproduction apparatus 100 can perform various processes, with the auxiliary power button (not shown), and then the input unit 102 outputs the output start information. When the controller 106 is configured with a CPU, on receiving the output start information, the CPU executes the output control module included in the control program 115 to start the output process.

Figure 5:
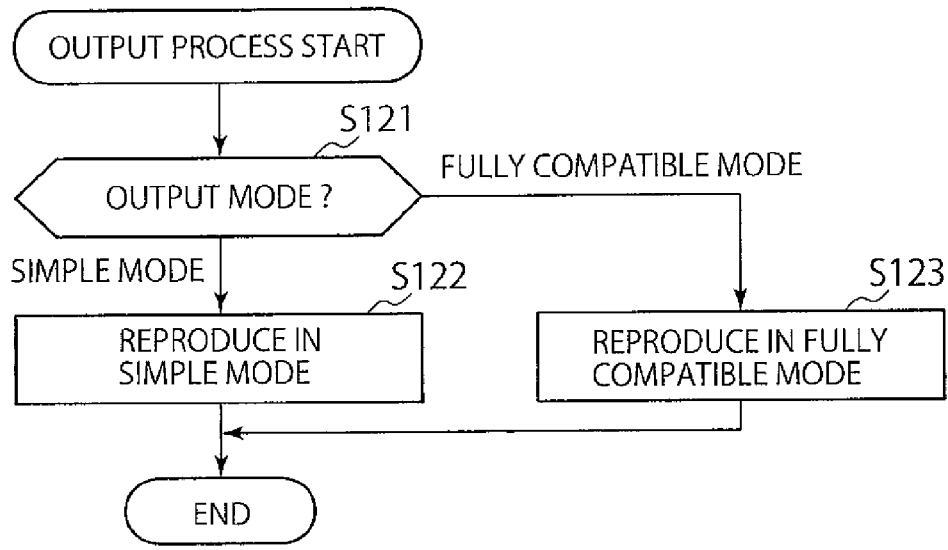
FIG. 5 is a flowchart showing an output process performed by the reproduction apparatus according to the first embodiment.

As shown in FIG. 5, the set-mode determination unit 139 acquires the set mode information 112 stored in the set-mode information storage unit 122 and determines whether the output mode indicated by the acquired set mode information 112 is the simple mode or the fully compatible mode (step S121). If it is determined that the output mode indicated by the set mode information 112 is the simple mode (step S121: simple mode), the output unit 140 looks up the mode definition information 111 corresponding to the simple mode, thereby reproducing content data of the BD 116 in the simple mode (step S122). On the other hand, if it is determined that the output mode indicated by the set mode information 112 is the fully compatible mode (step S121: fully compatible mode), the output unit 140 looks up the mode definition information 111 corresponding to the fully compatible mode, thereby reproducing content data of the BD 116 in the fully compatible mode (step S123). When the input receiving unit 138 receives the output complete information based on a user operation, the output process ends.

With the output process shown in FIG. 5, the content data of the BD 116 is output in the output mode in conformity with the major profile of the BD 116 when the fully compatible mode has been set in the set mode information 112. In order to conform with major profiles, in general, it is required to update firmware often and configure the reproduction apparatus 100 with high-performance hardware.

In the mode setting process shown in FIG. 3, the fully compatible mode is set when the reproduction apparatus 100 is for the stationary use. In the stationary use, the demand for a compact reproduction apparatus 100 is not stronger than the portable use, hence a relatively large reproduction apparatus 100 is acceptable. Therefore, the reproduction apparatus 100 can be configured with high-performance hardware for the stationary use. Moreover, when the reproduction apparatus 100 is for the stationary use, it can always be connected to a network to update its firmware easily over the network. Therefore, even if the update is made often, it is not bothersome to a user. It is also easy to provide the reproduction apparatus 100 with a connector for a flash memory. For the reasons above, when the reproduction apparatus 100 is for the stationary use, it is relatively easy to conform with major profiles so that a user can enjoy content of the BD 116 using a variety of functions offered by the profile of the BD 116.

On the contrary, when the simple mode has been set in the set mode information 112, content data of the BD 116 is output in the output mode with functions more restricted than the fully compatible mode. For the portable use, the demand for a compact reproduction apparatus 100 is strong, and hence it is mostly difficult to configure the reproduction apparatus 100 with high-performance hardware. Moreover, for the portable use, it is mostly difficult to provide the reproduction apparatus 100 with a connector for network connection, a flash memory, etc., for update of firmware thorough network connection, a flash memory, etc., due to a strong demand for a compact reproduction apparatus 100. However, with the simple mode set in the set mode information 112, having functions more restricted than the fully compatible mode, it is possible for a user to enjoy various content of BD 116 even if firmware is not often updated and the performance of hardware of the reproduction apparatus 100 is not high.

Moreover, for the portable use, the reproduction apparatus 100 is mostly provided with a relatively small display screen. Therefore, it tends to occur that a user cannot use functions of, for example, Bonus View and also it is difficult to view an image of content on a display screen. However, when the reproduction apparatus 100 is for the portable use, with the simple mode set in the set mode information 112, having functions more restricted than the fully compatible mode, a user can easily and comfortably enjoy various content of the BD 116.

Even for the stationary use, the position of the reproduction apparatus 100 changes until the reproduction apparatus 100 is fixed at a particular place by a user after shipped from a factory or when the user moves to a new address. However, the reproduction apparatus 100 starts the mode setting process shown in FIG. 3 whenever the auxiliary power button is depressed while power is being turned on with the main power button, to clear the reference position information 113 for new setting. With this process, erroneous determination of use of the reproduction apparatus 100 between the stationary use and the portable use is mostly avoided, hence accuracy of use determination can be enhanced.

Moreover, the use of the reproduction apparatus 100 may be changed between the portable use and the stationary use. However, as describe above, the reproduction apparatus 100 starts the mode setting process shown in FIG. 3 whenever the auxiliary power button is depressed while power is being turned on with the main power button, to clear the reference position information 113 for new setting. With this process, even if the use of the reproduction apparatus 100 is changed, the changed use can be determined accurately and the output mode of the reproduction apparatus 100 can be changed to a mode suitable for the changed use.

Although the first embodiment of the present invention is described above in detail, the first embodiment is not limited thereto.

For example, the initial value to be set in the set mode information 112 may be the fully compatible mode instead of the simple mode in step S113 of the initial setting process shown in FIG. 4. In this case, in the mode setting process shown in FIG. 3, if it is determined that the current position and the reference position indicated by the information 114 and the information 113, respectively, are different from each other in the movement determination step S104 (No in step S104), the movement determination unit 136 sets the simple mode in the mode information 112 and the reproduction apparatus 100 ends the mode setting process. On the hand, if it is determined that the current position and the reference position are equal to each other in the movement determination step S104 (Yes in step S104), the movement determination unit 136 does not change the mode set in the set mode information 112 and the number of movement-determination times count unit 137 performs the number of movement-determination times determination step in step S107.

Moreover, in this embodiment, the reproduction apparatus 100 communicates with the terminal equipment to acquire information indicating the position of the terminal equipment. However, the reproduction apparatus 100 may be equipped with a communication device for obtaining: information indicating latitude and longitude obtained through the GPS (Global Positioning System); information indicating the position of a base station or the orbit of a satellite used in wireless communication for mobile phones; or information composed of data of a MAC (Media Access Control) address of a Wi-Fi (a registered trademark) access point and data of the position of the access point, linked together, etc. In this case, the position-information acquisition unit 134 acquires information indicating the position obtained by the communication device and creates position information that includes the information indicating the position. In this way, it is possible to more accurately locate the position of the reproduction apparatus 100, so that the accuracy of determination on the movement of the reproduction apparatus 100 can be enhanced. For example, when the reproduction apparatus 100 is equipped with a GPS function, since the reproduction apparatus 100 can acquire information indicating its position, the reproduction apparatus 100 may set region information required for reproducing the BD 116.

Furthermore, instead of the communication unit 104, the reproduction apparatus 100 may be equipped with a sensor, such as a geomagnetism sensor, for detecting the attitude of the reproduction apparatus 100 and outputting information indicating the attitude. In this case, the position-information acquisition unit 134 may acquire or create information indicating position (position information) that includes information indicating an attitude (a direction, for example) output by the sensor and a time at which the attitude is detected. Then, the movement determination unit 136 may determine that the reproduction apparatus 100 is for the stationary use if an attitude (the reference attitude) of the reproduction apparatus 100 included in the reference position information 113 and an attitude (the current attitude) of the reproduction apparatus 100 included in the current position information are the same as each other, whereas if not, determine that the reproduction apparatus 100 is for the portable use.

Moreover, in the reproduction apparatus 100, the communication unit 104 may communicate with an imaging device such as a camera. In this case, the position-information acquisition unit 134 may acquire image information indicating an image captured by the imaging device. If the reproduction apparatus 100 is for an in-vehicle use, examples of the imaging device in the case of an automobile as a user's transportation means are a drive recorder, a camera as a back monitor, and so on. When the position-information acquisition unit 134 acquires image information, it may acquire or create information, as position information, including the acquired image information and information indicating a time at which the image is captured.

Moreover, concerning the image information, the movement determination unit 136 may determine that the reproduction apparatus 100 is for the stationary use if an image (the reference image) of the surroundings of the reproduction apparatus 100 included in the reference position information 113 and an image (the current image) of the surroundings of the reproduction apparatus 100 included in the current position information 114 are the same as each other, whereas if not, determine that the reproduction apparatus 100 is for the portable use. The determination of whether the reference image and the current image are the same as each other may be performed by comparing an accumulated absolute difference between values of corresponding pixels of the reference and current images, and a threshold value. In this case, the movement determination unit 136 may determine that the reference image and the current image are the same as each other if the accumulated absolute difference is equal to or smaller than the threshold value, whereas determine that the reference and current images are different from each other if the accumulated absolute difference is larger than the threshold value.

Furthermore, in the first embodiment, the reproduction apparatus 100 is provided with the display unit 109 and the speaker 110. However, the reproduction apparatus 100 may be provided with either the display unit 109 or the speaker 110. For example, when the reproduction apparatus 100 is to reproduce music content data stored on an optical disc, the reproduction apparatus 100 may be provided with the speaker 110 only or may output the reproduced content data to a display unit and a speaker separated from the reproduction apparatus 100.

In the first embodiment, the reproduction apparatus 100 starts the mode setting process whenever the auxiliary power button is depressed while power is being turned on with the main power button and the input unit 102 outputs the auxiliary power-switching information. However, the reproduction apparatus 100 may start the mode setting process when power is turned on at first with the main power button or at a regular interval (for example, every month). Moreover, the mode setting process may start when a user performs a specific operation to the input unit 102 for executing the mode setting process.

Moreover, in the first embodiment, the simple mode is set in the set mode information 112 if it is determined that the current position and the reference position are different from each other even only once in all $N_0$ times of movement determination steps S104. However, the simple mode may be set in the set mode information 112 if it is determined that the current position and the reference position are different from each other for a predetermined number of times in $N_0$ times of movement determination steps S104. In this way, the use of the reproduction apparatus 100 can be determined more accurately.

Furthermore, in the first embodiment, the output mode for the BD 116 is switched by automatically determining the use of the reproduction apparatus 100. In other words, the profile of the BD 116 is switched by automatically determining the use of the reproduction apparatus 100, however, not limited to the BD profile. For example, the resolution of an image composed of image data to be output to the display unit 109 may be switched. In this case, the resolution of an image may be switched so as to be compatible with the resolution of the display unit 109. For example, for analog image output, the resolution may be high resolution (for example, 1920×1080 pixels) for the stationary use and low resolution (for example, 1280×1,720 pixels) for the portable use. In this way, by switching the resolution of an image composed of image data to be output to the display unit 109 depending on the use of the reproduction apparatus 100, the image data can be output at the resolution automatically set depending on the display unit 109. Therefore, it is not required for a user to set the resolution depending on the use of the reproduction apparatus 100.

Moreover, the amount of power consumption may be switched depending on the use of the reproduction apparatus 100. For example, the reader unit 105 may be set in a normal power mode for the stationary use and a power save mode for the portable use. With this automatic power-consumption mode switching, it is possible to save power of the reproduction apparatus 100 with no bothersome user operation.

Explained in the first embodiment is the reproduction apparatus 100 for reproducing content data of the BD 116, as the output apparatus of the present invention, however, not limited thereto. For example, instead of the reproduction apparatus 100, the output apparatus may be an apparatus for receiving a broadcast and outputting content data of the broadcast to a display unit and a speaker. Various functions are offered in digital broadcasting. Therefore, the output apparatus may be controlled to output content data using all of the functions or main functions for the stationary use whereas using some of the functions for the portable use. In this case, instead of or in addition to the reader unit 105 the output apparatus may be equipped with a receiver for receiving a digital broadcast. Moreover, when the controller 106 is configured with a CPU, the function of the input receiving unit 138 may be achieved so as to receive information that indicates the start or completion of digital broadcast viewing and the function of the output unit 140 may be achieved so as to output content data of a digital broadcast. This type of output apparatus may be applied to a TV for viewing a digital broadcast, a mobile phone, a smartphone, etc., so that a user can enjoy a digital broadcast in an output mode suitable for the use of output apparatus.

Furthermore, in the first embodiment, the determination on whether to store position information as the reference position information 113 or the current position information 114 is made depending on the determination by the position-information acquisition unit 134 on whether or not the reference position information 113 in the position-information storage unit 123 has been cleared, however, not limited thereto. For example, the position-information acquisition unit 134 may store position information in the position-information storage unit 123 in the following manner. When the position-information acquisition unit 134 receives an instruction from the initial-mode setting unit 133 to create position information, it stores the position information in the position-information storage unit 123, as the reference position information 113. On the other hand, when the position-information acquisition unit 134 receives an instruction from the elapsed-time determination unit 135 to create position information, it stores the position information in the position-information storage unit 123, as the current position information 114. The performance of the position-information acquisition unit 134 in the manner described above also provides the same advantages as the first embodiment.

Furthermore, the terminal equipment may transmit position information including its position and a time at which the position is located and then the communication unit 104 may acquire the position information. In this case, the time included in the acquired position information can be used as position-located time information. Therefore, with no need to acquire current time information from the time clock unit 103, the communication unit 104 can acquire more accurate time at which the position is located. The performance of the communication unit 104 in the manner described above also provides the same advantage as the first embodiment.

(Second Embodiment)

A reproduction apparatus will be explained with reference to the drawings, as an output apparatus according to a second embodiment of the present invention.

A reproduction apparatus 200 according to the second embodiment is an apparatus for reproducing (outputting) content data stored on a BD. In particular, the reproduction apparatus 200 determines the use based on whether or not vibration in accordance with the movement of the reproduction apparatus 200 is detected, in addition to the determination of whether or not it has been moved for a predetermined period of time and reproduces content data of a BD in an output mode in accordance with the determined use.

Figure 6:
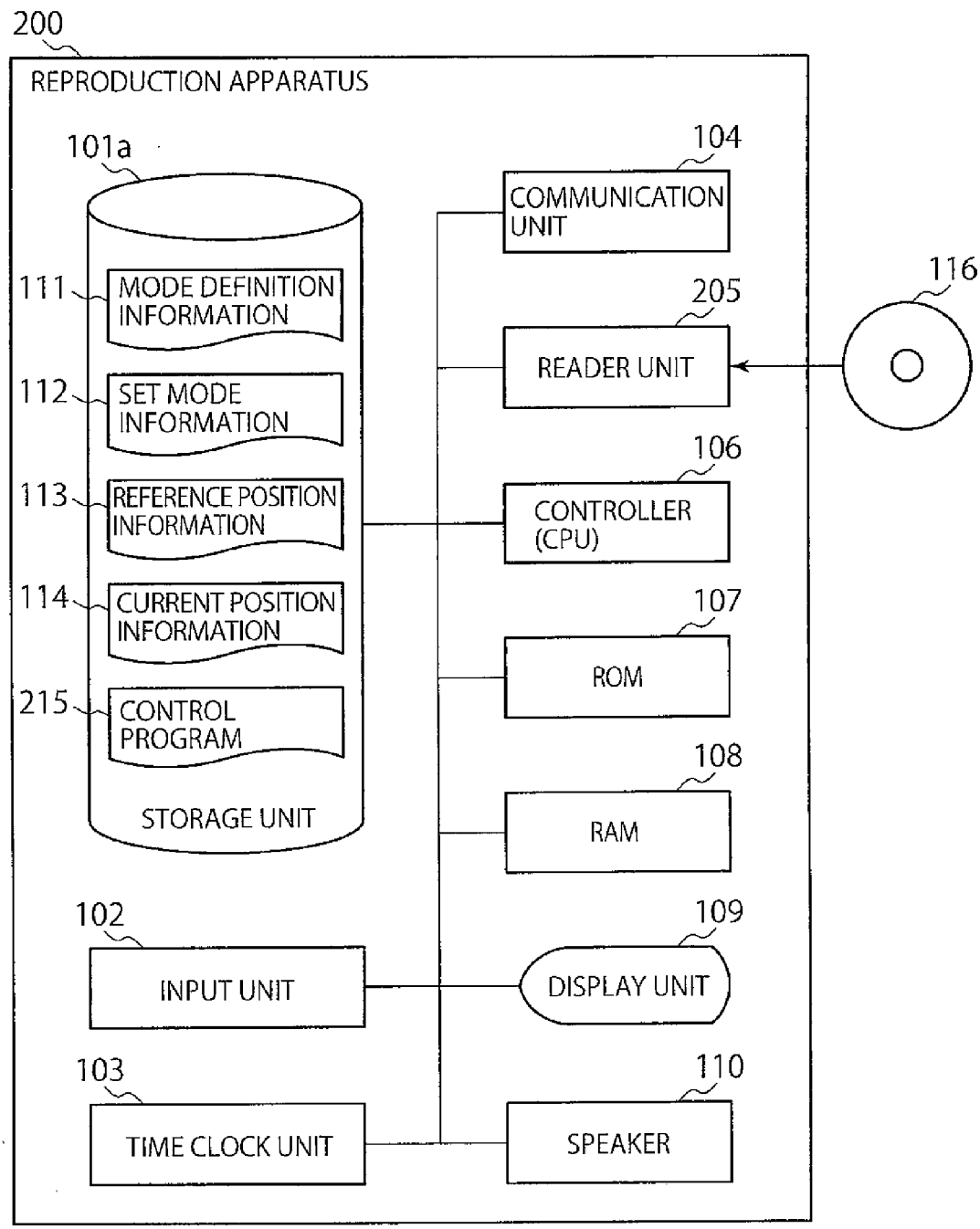
FIG. 6 shows a block diagram of a reproduction apparatus according to a second embodiment of the present invention.

FIG. 6 shows a block diagram of the reproduction apparatus 200 of the second embodiment. The reproduction apparatus 200 has a feature in that there are a storage unit 101a storing a control program 215 and a reader unit 205, instead of the storage unit 101 and the reader unit 105 shown in FIG. 1, the other units are analogous to or the same as those shown in FIG. 1.

The control program 215 is a software program including an initial setting module and an output control module. The initial setting module is a software program for the reproduction apparatus 200 to perform initial setting to determine its use. The output control module is a software program for outputting content data stored on the BD 116. The output control module includes a software program for determining the use of the reproduction apparatus 200 based on the determination of whether or not the reproduction apparatus 200 has been moved for a predetermined period of time and the determination of whether or not vibration in accordance with the movement of the reproduction apparatus 200 is detected and for setting an output mode.

In the same manner as the first embodiment, in this embodiment, there are the stationary use and the portable use for the reproduction apparatus 200. The fully compatible mode and the simple mode suitable for the stationary use and the portable use, respectively, are defined in the mode definition information 111.

In addition to the configuration of the reader unit 105 of the first embodiment, the reader unit 205 is equipped with a bandpass filter that outputs signal (a vibration detection signal) S that detects vibration of the reproduction apparatus 200 when a servo signal passes therethrough. This bandpass filter allows a frequency component related only to vibration in accordance with the movement of the reproduction apparatus 200 to pass therethrough. For example, this bandpass filter allows a signal of several ten Hz to several hundred Hz to pass therethrough. When the controller 106 is configure with a CPU, the function of the bandpass filter may be achieved with a software program executed by the CPU.

Figure 7:
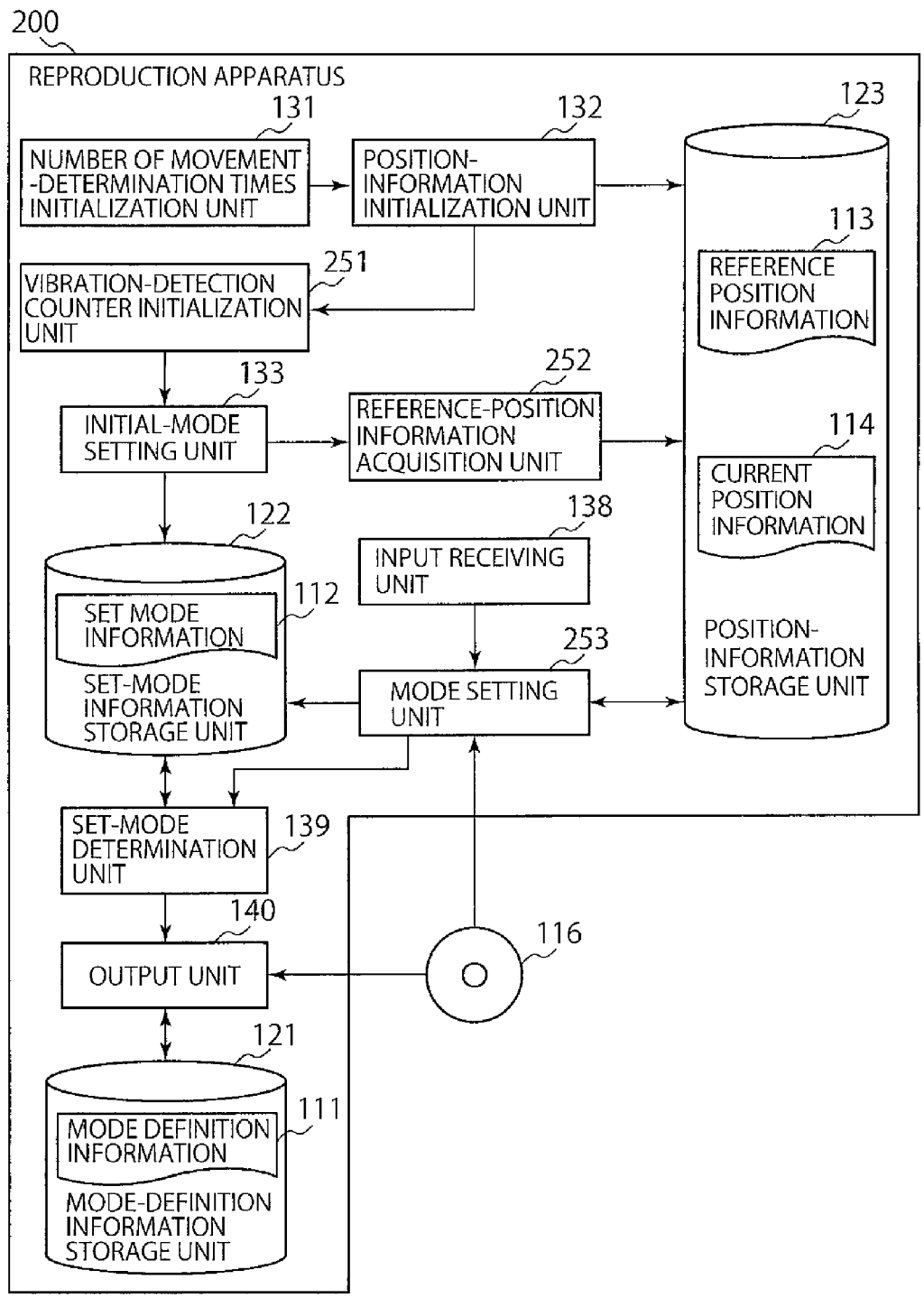
FIG. 7 shows a detailed block diagram of the reproduction apparatus according to the second embodiment.

FIG. 7 shows a detailed block diagram of the reproduction apparatus 200 of the second embodiment. In FIG. 6, when the controller 106 is configured with a CPU, the CPU cooperates with the storage unit 101a, the input unit 102, the time clock unit 103, the communication unit 104, the reader unit 205, the ROM 107, the RAM 108, the display unit 109, and the speaker 110 to execute the control program 215 to achieve various functions corresponding to the various units shown in FIG. 7.

Figure 8:
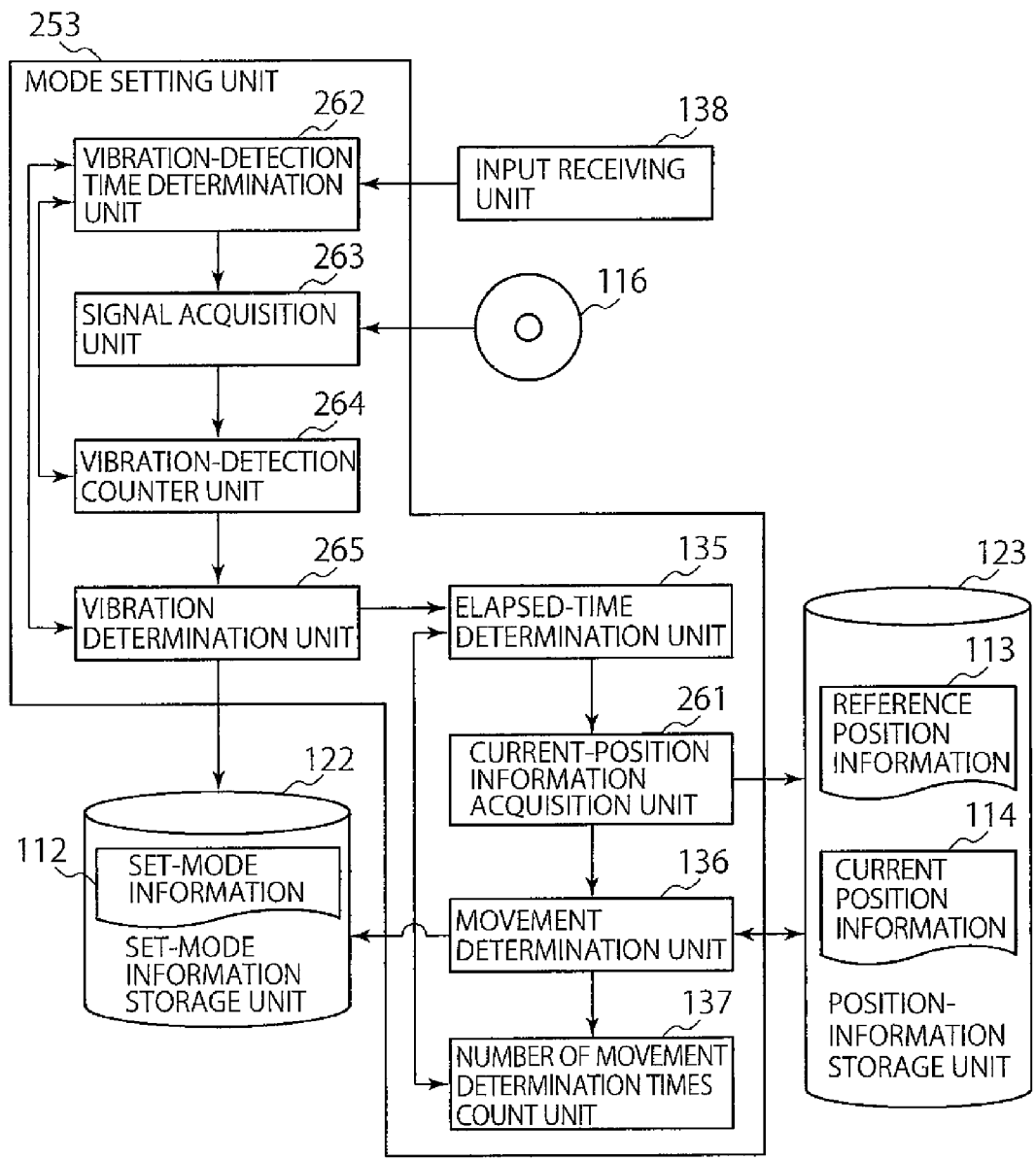
FIG. 8 shows a block diagram of a mode setting unit of the reproduction apparatus according to the second embodiment.

As shown in FIG. 7, the reproduction apparatus 200 is provided with a vibration-detection counter initialization unit 251, a reference-position information acquisition unit 252, and a mode setting unit 253 (a mode setting apparatus), instead of the position-information acquisition unit 134, the other units being analogous to or the same as those shown in FIG. 2. The mode setting unit 253 is provided, as shown in FIG. 8, with the elapsed-time determination unit 135, the movement determination unit 136, and the number of movement-determination times count unit 137 shown in FIG. 2, and other units which will be explained later.

The vibration-detection counter initialization unit 251 occupies a memory area in, for example, the RAM 108 (FIG. 6), for storing vibration-detection counter information that indicates a count value of a counter C (a vibration detection counter, not shown) for counting the number of times at which vibration is detected for the reproduction apparatus 200 due to movement. The vibration-detection counter initialization unit 251 sets zero in the vibration-detection counter information.

The reference-position information acquisition unit 252 receives an instruction from the initial-mode setting unit 133 when the initial-mode setting unit 133 sets the initial value of the output mode as described in the first embodiment. Then, the reference-position information acquisition unit 252 acquires information indicating the position of terminal equipment (not shown and the same as the terminal equipment described in the first embodiment) and, immediately thereafter, acquires current time information. Then, the reference-position information acquisition unit 252 creates position information by linking the acquired information indicating the position and current time information. Thereafter, the reference-position information acquisition unit 252 stores the created position information in the position-information storage unit 123, as the reference position information 113. When the controller 106 is configured with a CPU, the function of the reference-position information acquisition unit 252 is achieved, for example, by cooperation of the CPU that executes the initial setting module included in the control program 215, the time clock unit 103, the communication unit 104, and the RAM 108, and also the ROM 107 according to need. The reference-position information acquisition unit 252 corresponds to the first position-information acquisition unit for acquiring the reference position information 113 (first position information indicating a position at a first time) described in the first embodiment.

The mode setting unit 253 determines the use of the reproduction apparatus 200 based on the determination of whether the reproduction apparatus 200 has been moved for a predetermined period of time and on the determination of whether the vibration due to the movement of the reproduction apparatus 200 is detected and sets an output mode in accordance with the determined use. As shown in FIG. 8, the mode setting unit 253 is provided with the elapsed-time determination unit 135, the movement determination unit 136, and the number of movement-determination times count unit 137, the same as the first embodiment. Moreover, the mode setting unit 253 is provided with a current-position information acquisition unit 261, a vibration-detection time determination unit 262, a signal acquisition unit 263, a vibration-detection counter unit 264, and a vibration determination unit 265.

On receiving an instruction from the elapsed-time determination unit 135 when it determines that that the elapsed time $TS_1$ has reached or has passed the threshold value $TH_1$ [sec], the current-position information acquisition unit 261 acquires information indicating the position of the terminal equipment and, immediately thereafter, acquires current time information. Then the current-position information acquisition unit 261 creates position information by linking the acquired information indicating the position of the terminal equipment and current time information. Thereafter, the current-position information acquisition unit 261 stores the created position information in the position-information storage unit 123, as the current position information 114.

When the controller 106 is configured with a CPU, the function of the current-position information acquisition unit 261 is achieved, for example, by cooperation of the CPU that executes the output control module included in the control program 215, the time clock unit 103 and the communication unit 104, and also the ROM 107 according to need. The current-position information acquisition unit 261 corresponds to the second position-information acquisition unit for acquiring the current position information 114 (second position information indicating a position at a second time that is later than the first time), in relation to the reference-position information acquisition unit 252 that corresponds to the first position-information acquisition unit for acquiring the reference position information 113 (first position information indicating a position at a first time), described in the first embodiment.

The vibration-detection time determination unit 262 determines whether a time (a vibration detection time) TV during which vibration due to the movement of the reproduction apparatus 200 is detected has reached or has passed a predetermined threshold value B [millisec]. In detail, on receiving an instruction from the input receiving unit 138 that has received output start information based on a user operation, the vibration-detection time determination unit 262 acquires current time information from the time clock unit 103 and stores the time indicated by the current time information as a vibration-detection start time. Thereafter, the vibration-detection time determination unit 262 acquires current time information from the time clock unit 103 continuously or at a predetermined interval and calculates an elapsed time from the vibration-detection start time, as a vibration detection time TV. In this way, the vibration-detection time determination unit 262 measures the vibration detection time TV.

Then, the vibration-detection time determination unit 262 compares the vibration detection time TV and the threshold value B [millisec] to determine whether the vibration detection time TV has reached or has passed the threshold value B [millisec]. If it is determined that the vibration detection time TV has reached or has passed the threshold value B [millisec], the vibration-detection time determination unit 262 outputs an instruction to the vibration determination unit 265. On the other hand, if it is determined that the vibration detection time TV has not reached or passed the threshold value B [millisec], the vibration-detection time determination unit 262 outputs an instruction to the signal acquisition unit 263. The vibration-detection time determination unit 262 continuously outputs the instruction to the signal acquisition unit 263 until it is determined that the vibration detection time TV has reached or has passed the threshold value B [millisec]. When the controller 106 is configured with a CPU, the function of the vibration-detection time determination unit 262 is achieved, for example, by cooperation of the CPU that executes the output control module included in the control program 215, the time clock unit 103, and the RAM 108, and also the ROM 107 according to need.

While continuously receiving the instruction from the vibration-detection time determination unit 262, as described above, the signal acquisition unit 263 repeatedly performs acquisition (sampling) of a vibration detection signal S for a period of time beyond a predetermined threshold value $TH_2$ [millisec]. The threshold value $TH_2$ [millisec] is set to a value smaller (in other words, shorter) than the threshold value B [millisec] for acquiring several number of vibration times detection signals S. In detail, for example, on receiving an instruction from the vibration-detection time determination unit 262 that has started the measurement of the vibration detection time TV, the signal acquisition unit 263 starts the acquisition of the vibration detection signal S and also acquires current time information from the time clock unit 103 at the time of the acquisition of the vibration detection signal S. The signal acquisition unit 263 continuously acquires the vibration detection signal S and also acquires the current time information from the time clock unit 103 at the time of the acquisition of the vibration detection signal S continuously or at a predetermined interval to measure a time (sampling time) $TS_2$ for acquiring the vibration detection signal S. When the sampling time $TS_2$ is equal to or larger than the threshold value $TH_2$ [millisec], the signal acquisition unit 263 completes the acquisition of the vibration detection signal S.

In this way, the signal acquisition unit 263 acquires a vibration detection signal S as a sampled signal in one sampling. The signal acquisition unit 263 outputs the vibration detection signal S in one sampling to the vibration-detection counter unit 264. On receiving an instruction from the vibration-detection time determination unit 262, the signal acquisition unit 263 again acquires a vibration detection signal S for which the sampling time $TS_2$ is equal to or larger than the threshold value $TH_2$ [millisec], and repeats this step. When the controller 106 is configured with a CPU, the function of the signal acquisition unit 263 is achieved, for example, by cooperation of the CPU that executes the output control module included in the control program 215, the reader unit 105, the time clock unit 103, and the RAM 108, and also the ROM 107 according to need.

The reproduction apparatus 200 may be equipped with a sensor, such as an acceleration sensor, for detecting the vibration of the reproduction apparatus 200 and outputting a signal indicating the vibration so that the signal acquisition unit 263 can acquire the signal as the vibration detection signal S.

On receiving the vibration detection signal S acquired by the signal acquisition unit 263, the vibration-detection counter unit 264 counts the number of times of occurrence of vibration until the vibration detection time TV has reached or has passed the threshold value B [millisec] by using the vibration detection counter C (not shown). In detail, when the signal acquisition unit 263 acquires a sampled signal S (a vibration detection signal 5) per one sampling, the sampled signal S is output to the vibration-detection counter unit 264. Then, the vibration-detection counter unit 264 determines whether the sampled signal S per one sampling carries a value that is equal to or larger than a predetermined threshold value A [mV]. If the sampled signal S per one sampling carries a value equal to or larger than the threshold value A [mV], it is determined that vibration occurs on the reproduction apparatus 200. Then, the vibration-detection counter unit 264 adds 1 to the vibration detection counter C and outputs an instruction to the vibration-detection time determination unit 262. On the other hand, if the sampled signal S per one sampling does not carry a value equal to or larger than the threshold value A [mV], it is determined that vibration does not occur on the reproduction apparatus 200. Then, the vibration-detection counter unit 264 does not add 1 to the vibration detection counter C and outputs an instruction to the vibration-detection time determination unit 262. When the controller 106 is configured with a CPU, the function of the vibration-detection counter unit 264 is achieved, for example, by cooperation of the CPU that executes the output control module included in the control program 215 and the RAM 108, and also the ROM 107 according to need.

The vibration determination unit 265 compares a value of the vibration detection counter C counted by the vibration-detection counter unit 264 and a predetermined threshold value $C_0$ [number of times]. If the value of the vibration detection counter C is equal to or larger than the threshold value $C_0$ [number of times], it is determined that the use of the reproduction apparatus 200 is the portable use in which vibration may occur, the vibration determination unit 265 sets the simple mode in the set mode information 112. On the other hand, if the value of the vibration detection counter C is smaller than the threshold value $C_0$ [number of times], it is determined that the use of the reproduction apparatus 200 is the stationary use in which vibration may not occur, the vibration determination unit 265 sets the fully compatible mode in the set mode information 112. When the controller 106 is configured with a CPU, the function of the vibration determination unit 265 is achieved, for example, by cooperation of the CPU that executes the output control module included in the control program 215 and the RAM 108, and also the ROM 107 according to need.

Described above is the configuration or the mechanism of the reproduction apparatus 200 in the second embodiment. Hereinbelow, various processes performed by the reproduction apparatus 200 in the second embodiment will be explained.

Figure 9:
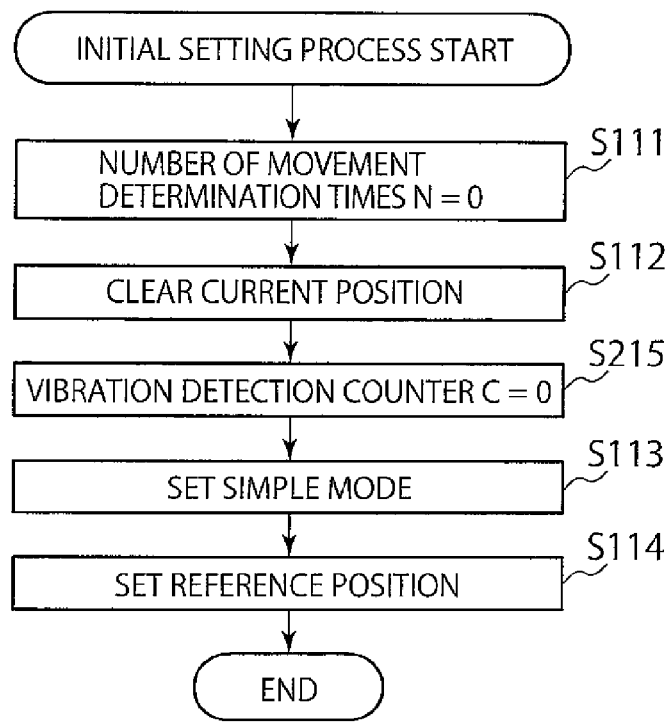
FIG. 9 is a flowchart showing an initial setting process performed by the reproduction apparatus according to the second embodiment.

The reproduction apparatus 200 starts an initial setting process shown in FIG. 9 whenever the auxiliary power button is depressed while power is being turned on with the main power button and the input unit 102 outputs the auxiliary power-switching information. When the controller 106 is configured with a CPU, for example, the CPU in a waiting mode receives the auxiliary power switching information to execute the initial setting module included in the control program 215, thereby starting the initial setting process shown in FIG. 9.

The initial setting process shown in FIG. 9 is the same as that shown in FIG. 4 except that there is a counter setting step S215 between the position-information clear step S112 and the simple-mode setting step S113 (FIG. 4). Therefore, when the position-information initialization unit 132 clears the position information (the reference position 113 and the current position information 114) stored in the position-information storage unit 123 (step S112), the vibration-detection counter initialization unit 251 sets zero in the vibration detection counter C. Then, the initial-mode setting unit 133 sets the simple mode, as an initial value, in the set mode information 112 (step S113).

Next, an output process to be performed by the reproduction apparatus 200 will be explained with respect to FIG. 10. The output process starts when the output start button is depressed while the reproduction apparatus 200 is being in the power turned-on mode with the auxiliary power button and then the input unit 102 outputs the output start information. When the controller 106 is configured with a CPU, on receiving the output start information, the CPU executes the output control module included in the control program 215 to start the output process.

Figure 10:
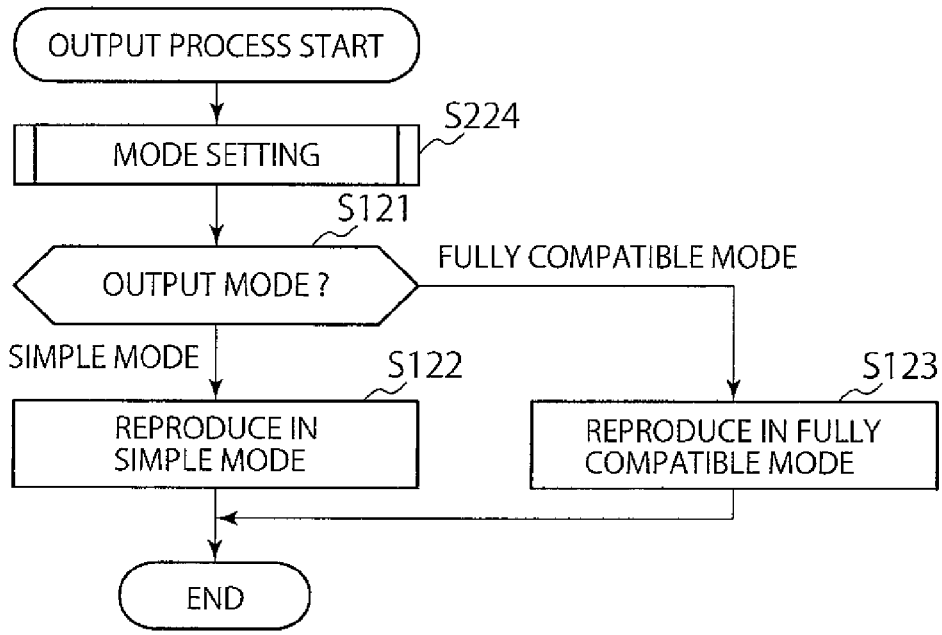
FIG. 10 is a flowchart showing an output process performed by the reproduction apparatus according to the second embodiment.

As shown in FIG. 10, the mode setting unit 253 determines the use of the reproduction apparatus 200 based on the determination of whether the reproduction apparatus 200 has been moved for a predetermined period of time and on the determination of whether the vibration due to the movement of the reproduction apparatus 200 is detected and sets an output mode in accordance with the determined use (step S224).

The mode setting step S224 will be explained in detail with FIGS. 11 and 12.

Figure 11:
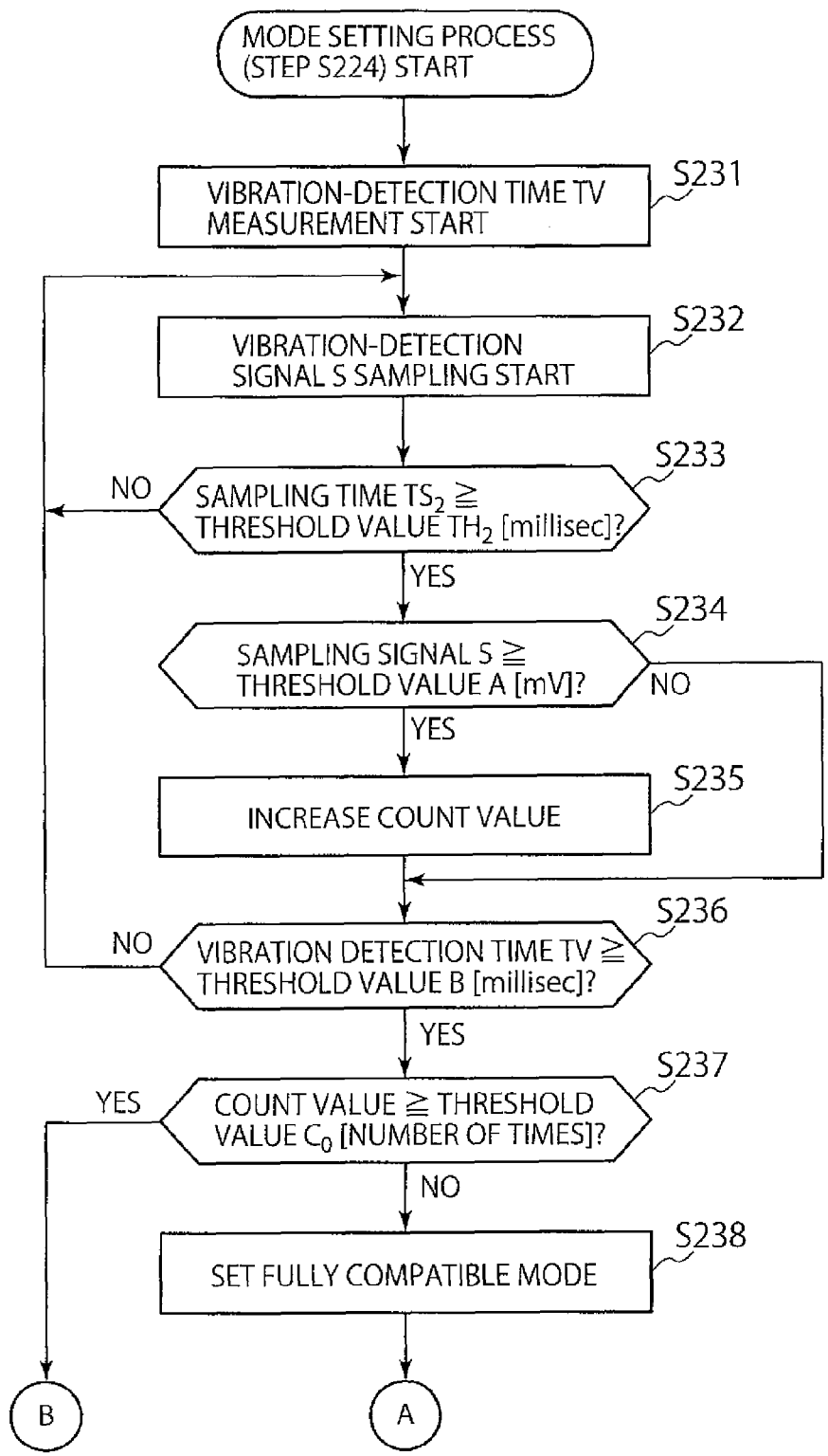
FIG. 11 is a flowchart showing a mode setting process performed by the reproduction apparatus according to the second embodiment.

In FIG. 11, on receiving an instruction from the input receiving unit 138 that receives output start information based on a user operation, the vibration-detection time determination unit 262 starts measurement of the vibration detection time TV (step S231).

On receiving an instruction from the vibration-detection time determination unit 262 that has started the measurement of the vibration detection time TV, the signal acquisition unit 263 starts sampling of the vibration detection signal S (step S232).

The signal acquisition unit 263 acquires the vibration detection signal S and measures the sampling time $TS_2$ and determines whether the sampling time $TS_2$ is equal to or larger than the threshold value $TH_2$ [millisec] (step S233). If it is determined that the sampling time $TS_2$ is not equal to or larger than the threshold value $TH_2$ [millisec] (No in step S233), the signal acquisition unit 263 continues the sampling of the vibration detection signal S (step S232). On the other hand, if it is determined that the sampling time $TS_2$ is equal to or larger than the threshold value $TH_2$ [millisec] (Yes in step S233), the signal acquisition unit 263 completes the sampling of the vibration detection signal S. In this way, the signal acquisition unit 263 acquires a vibration detection signal S as a sampled signal in one sampling and outputs the vibration detection signal S in one sampling to the vibration-detection counter unit 264.

On receiving the vibration detection signal S acquired by the signal acquisition unit 263, the vibration-detection counter unit 264 determines whether the sampled signal S per one sampling carries a value that is equal to or larger than the threshold value A [mV] (step S234). If it is determined that the sampled signal S per one sampling carries a value equal to or larger than the threshold value A [mV] (Yes in step S234), the vibration-detection counter unit 264 sends an instruction based on the determination to the vibration-detection counter unit 264 to add 1 to the vibration detection counter C to increase the value of the vibration detection counter C (step S235).

After the vibration-detection counter C increase step S235 or after the determination in that the sampled signal S per one sampling does not carry a value equal to or larger than the threshold value A [mV] (No in step S234), on receiving an instruction from the vibration-detection counter unit 264, the vibration-detection time determination unit 262 determines whether the vibration detection time TV has reached or has passed the threshold value B [millisec] (step S236).

If it is determined that the vibration detection time TV has not reached or passed the threshold value B [millisec] (No in step S236), the vibration-detection signal S sampling step S232 to the vibration-detection counter C increase step S235 to be performed by the signal acquisition unit 263 and the vibration-detection counter unit 264 are repeated. In this way, the number of detection times at which vibration is detected for the reproduction apparatus 200 during the vibration detection time TV until it has reached or has passed the threshold value B [millisec] is detected by the vibration detection counter C.

On the other hand, if it is determined that the vibration detection time TV has reached or has passed the threshold value B [millisec] (Yes in step S236), the vibration determination unit 265 acquires information indicating the value of the vibration detection counter C from the vibration-detection counter unit 264 and compares the acquired value and the threshold value $C_0$ [number of times] to determine whether the value is equal to or larger than the threshold value $C_0$ [number of times] (step S237).

If it is determined that the value of the vibration detection counter C is smaller than the threshold value $C_0$ [number of times] (No in step S 237), it is determined that the use of the reproduction apparatus 200 is the stationary use in which vibration may not occur, the vibration determination unit 265 provisionally sets the fully compatible mode in the set mode information 112 (step S238). However, there is a possibility that the vibration is detected because the reproduction apparatus 200 is being moved in the portable use. Therefore, the elapsed-time determination step S102 to the number of movement-determination times determination step S107 shown in FIG. 3 described in the first embodiment are performed, with an additional step S240, as shown in FIG. 12.

Figure 12:
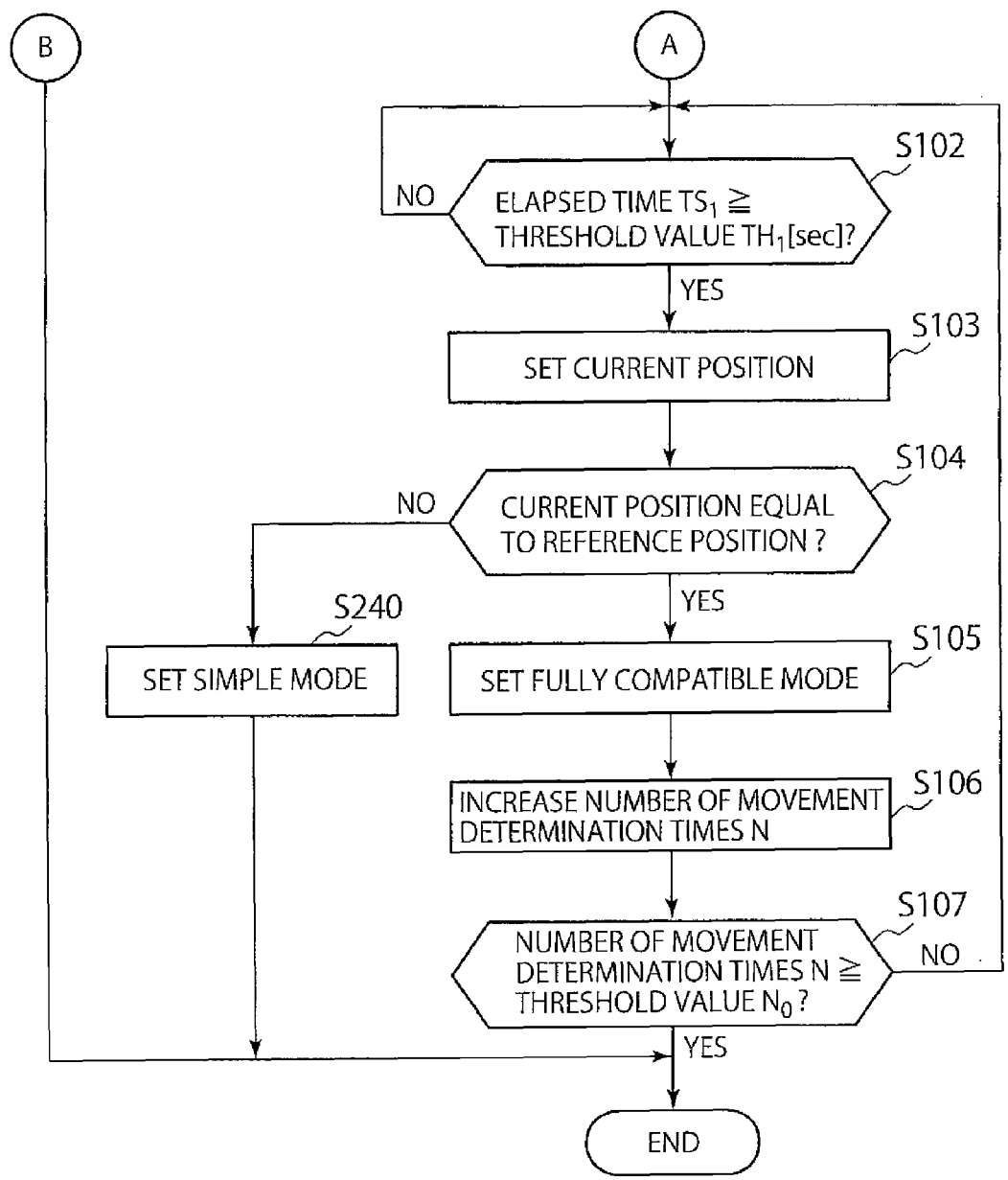
FIG. 12 is a flowchart showing a mode setting process that follows the process shown in FIG. 11 and performed by the reproduction apparatus according to the second embodiment.

In FIG. 12, in the same manner as described with respect to FIG. 3, if it is determined that the current position and the reference position indicated by the information 114 and the information 113, respectively, are equal to each other, that is, the reproduction apparatus 200 is not moved (Yes step S104), the movement determination unit 136 sets the fully compatible mode (once provisionally set in step S238 of FIG. 11) in the set mode information 112 (step S105), followed by steps S106 and S107.

On the other hand, if it is determined that the current position and the reference position are different from each other (No in step S104), the movement determination unit 136 sets the simple mode in the set mode information 112 (step S240), in place of the fully compatible mode once provisionally set in step S238 of FIG. 11, then the mode setting process ends.

On the other hand, if it is determined that value of the vibration detection counter C is equal to or larger than the threshold value $C_0$ [number of times] (Yes in step S 237 in FIG. 11), it is determined that the use of the reproduction apparatus 200 is the portable use in which vibration may occur, the mode setting process ends with no mode setting because the simple mode for the portable use has been set in the set mode information 112 in the initial setting process shown in FIG. 9.

As described above, in the same manner as the first embodiment, the simple mode is set in the initial setting process in the second embodiment. Moreover, in the second embodiment, with the mode setting process (step S224 in FIGS. 10 to 12), if the vibration due to the movement of the reproduction apparatus 200 is detected or the movement thereof is detected, the use of the reproduction apparatus 200 is determined as the portable use, hence the simple mode is set (actually, no mode setting is made due to the initial setting process to set the simple mode). On the other hand, if the vibration and movement are not detected, the use of the reproduction apparatus 200 is determined as the stationary use, hence the fully compatible mode is set.

As described above, in the second embodiment, the use of the reproduction apparatus 200 is determined based on whether or not the vibration of the reproduction apparatus 200 is detected. The determination of use based on the vibration detection is quicker than the determination of use based on the movement detection, hence the output mode can be set quickly. Moreover, in the second embodiment, the determination of use based on the vibration detection is followed by the determination of use based on the movement detection. This is because the determination of use based only on the vibration detection may cause erroneous determination in which if the value of the vibration detection counter C is smaller than the threshold value $C_0$ [number of times] (No in step S 237 in FIG. 11), it is determined that the use of the reproduction apparatus 200 is the stationary use even if the vibration occurs due to the movement of the reproduction apparatus 200. Therefore, in the second embodiment, after the determination of use based on the vibration detection, the determination of use based on the movement detection is performed to avoid the erroneous determination. In this way, the rate of erroneously determination of the stationary use is reduced, that is, the stationary use is accurately determined so that a user can enjoy content data of the BD 116 in the fully compatible mode.

Moreover, in the second embodiment, since the simple mode is set in the initial setting mode, compatibility in reproduction can be maintained, in the same manner as the first embodiment.

(Third Embodiment)

A recording apparatus will be explained with reference to the drawings, according to a third embodiment of the present invention.

A recording apparatus 300 according to the third embodiment is an apparatus for recording content data on a BD as a storage medium. The recording apparatus 300 determines in what mode (use mode) it is to be used based on whether it has been moved for a predetermined period of time and then reproduces content data from a BD with a recording method (recording mode) in accordance with the determined mode in which it is to be used. In the third embodiment, the recording apparatus 300 receives a digital broadcast as content data to be recorded on a BD.

As for the use of the recording apparatus 300, there are a stationary use and a portable use, in the same manner as the first embodiment. A recording mode (a second mode) suitable for the stationary use is a fully compatible mode compatible, for example, with major BD standards (for example, Profile 1.1, Profile 2.0 and Profile 5.0). A recording mode (a first mode) suitable for the portable use is a simple mode compatible, for example, with major BD standards (for example, Profile 1.1, Profile 2.0 and Profile 5.0), with Picture-in-Picture and Bonus View including Virtual Package omitted among the functions offered by the major BD standards.

In the same manner as the first embodiment, information is set as the mode definition information 111, in the third embodiment, that are the fully compatible mode suitable for the stationary use and the contents of the fully compatible mode, and the simple mode suitable for the portable use and the contents of the simple mode.

The recording mode suitable for the stationary use can be freely determined depending on the functions according to the standards of storage media or the like. The recording mode suitable for the portable use can also be freely determined as long as the functions for this mode is more restricted than the recording mode suitable for the stationary use.

Figure 13:
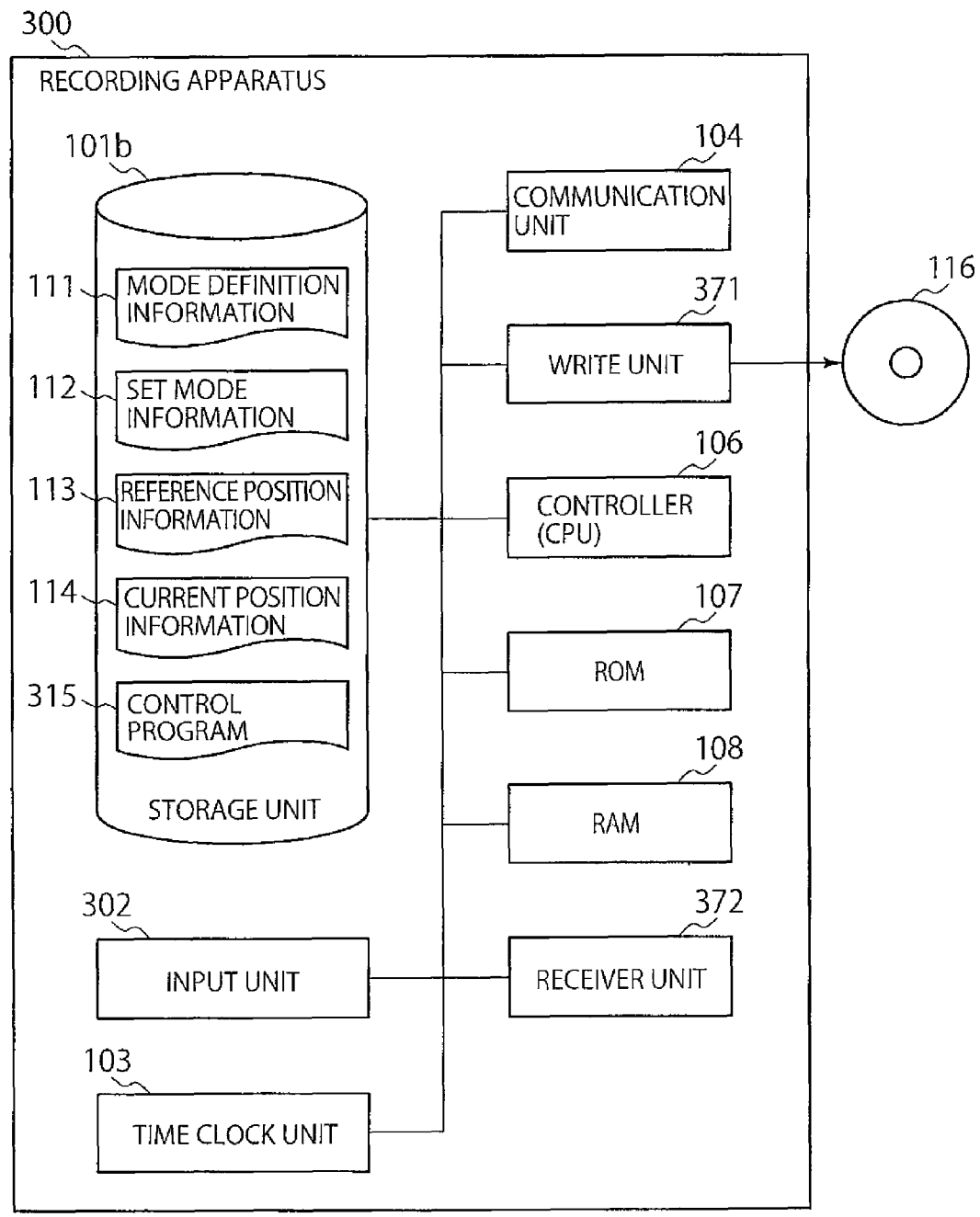
FIG. 13 shows a block diagram of a recording apparatus according to a third embodiment of the present invention.

FIG. 13 shows a block diagram of the recording apparatus 300 of the third embodiment. The recording apparatus 300 has a feature in that there are a storage unit 101b storing a control program 315, an input unit 302, a write unit 371, and a receiver unit 372, instead of the storage unit 101, the input unit 102, the reader unit 105, the display unit 109, and the speaker 110 shown in FIG. 1, the other units are analogous to or the same as those shown in FIG. 1.

The control program 315 is a software program including a mode setting module and a recording control module. The mode setting module is a software program for determining the use of the recording apparatus 300 based on whether the recording apparatus 300 has been moved for a predetermined period of time in the same manner as the first embodiment and for setting a recording mode compatible with the determined use of the recording apparatus 300. The recording control module is a software program for recording content data on the BD 116 in a recording mode set in the recording apparatus 300.

The input unit 302 that is configured, for example, with various types of buttons, switches, etc., to be operated by a user, outputs information depending on a user operation. For example, the input unit 302 includes a recording start button, and a recording halt button (not shown), in addition to the main power button and the auxiliary power button in the same manner as the first embodiment.

The recording start button is used for starting a process (a recording process) for recoding content data of a digital broadcast received at a channel selected by a user. The input unit 302 outputs recording start information when the recording start button is depressed while the recording apparatus 300 is in a power turned-on mode in which power is turned on so that the recording apparatus 300 can perform various processes. The recording halt button is used for halting the recording process. The input unit 302 outputs recording halt information when the recording halt button is depressed during the recording process.

The write unit 371 that is configured, for example, with a light emitting device, a lens, a motor, and a light receiving device, etc., records content data on the BD 116 and outputs a servo signal. The receiver unit 372 that is configured, for example, with a tuner or the like, receives a digital broadcast at a channel selected by a user and outputs the received content data.

Figure 14:
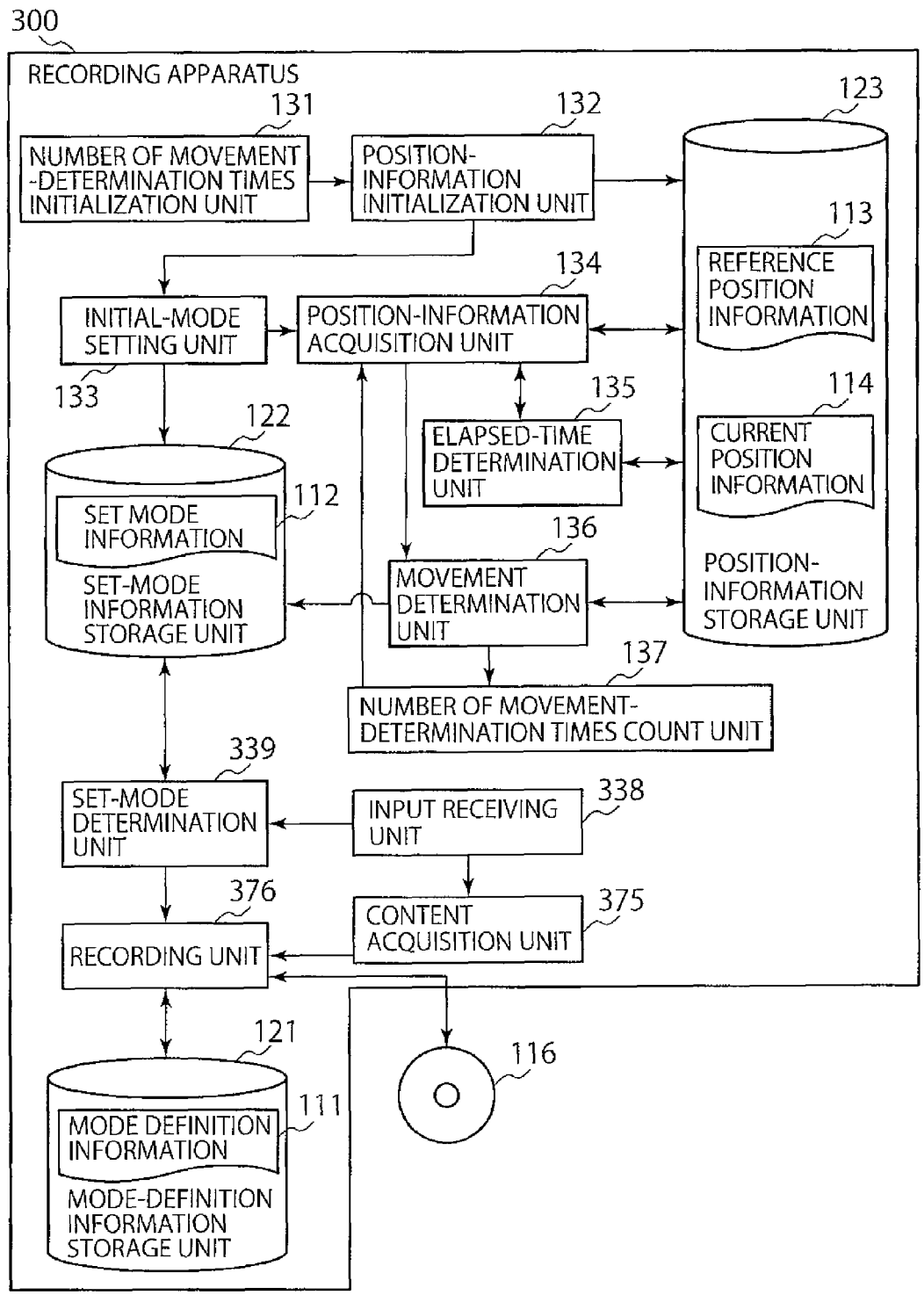
FIG. 14 shows a detailed block diagram of the recording apparatus according to the third embodiment.

FIG. 14 shows a detailed block diagram of the recording apparatus 300 of the third embodiment. In FIG. 13, when the controller 106 is configured with a CPU, the CPU cooperates with the storage unit 101b, the input unit 302, the time clock unit 103, the communication unit 104, the write unit 371, the ROM 107, the RAM 108, and the receiver unit 372 to execute the control program 315 to achieve various functions corresponding to the various units shown in FIG. 14.

As shown in FIG. 14, the recording apparatus 300 is provided with an input receiving unit 338, a set-mode determination unit 339, a content acquisition unit 375, and a recording unit 376, instead of the input receiving unit 138, the set-mode determination unit 139, and the output unit 140 shown in FIG. 2, the other units being analogous to or the same as those shown in FIG. 2.

The input receiving unit 338 receives recording start information or recording halt information based on a user operation. When the controller 106 is configured with a CPU, the function of the input receiving unit 338 is achieved, for example, by cooperation of the input unit 302 and the CPU in the power turned-on mode in which power is turned on so that the recording apparatus 300 can perform various processes.

When the input receiving unit 338 receives the recording start information, the set-mode determination unit 339 looks up the set mode information 112 stored in the set-mode information storage unit 122 to determine whether the recording mode set in the looked-up set mode information 112 is the fully compatible mode or the simple mode. When the controller 106 is configured with a CPU, the function of the set-mode determination unit 339 is achieved, for example, by cooperation of the CPU that executes the recording control module included in the control program 315 and the RAM 108, and also the ROM 107 according to need.

The content acquisition unit 375 acquires content data of a digital broadcast at a channel selected by a user. When the controller 106 is configured with a CPU, the function of the content acquisition unit 375 is achieved, for example, by cooperation of the CPU that executes the recording control module included in the control program 315, the receiver unit 372 and the RAM 108, and also the ROM 107 according to need.

The recording unit 376 records the content data acquired by the content acquisition unit 375 on the BD 116 in the recording mode set in the recording apparatus 300. In detail, the recording unit 376 acquires information that indicates a result of determination described above from the set-mode determination unit 339 and then acquires the mode definition information 111 corresponding to the acquired information from the mode-definition information storage unit 121. Thereafter, in accordance with the recording mode indicated by the acquired mode definition information 111, the recording unit 376 appropriately converts the content data acquired by the content acquisition unit 375 and records the converted content data on the BD 116. When the controller 106 is configured with a CPU, the function of the recording unit 376 is achieved, for example, by cooperation of the CPU that executes the recording control module included in the control program 315, the write unit 376, and the RAM 108, and also the ROM 107 according to need.

Described above is the configuration or the mechanism of the recording apparatus 300 in the third embodiment. Hereinbelow, various processes performed by the recording apparatus 300 in the third embodiment will be explained.

The recording apparatus 300 starts a mode setting process in the same manner as shown in FIG. 3 whenever the auxiliary power button is depressed while power is being turned on with the main power button and the input unit 302 outputs the auxiliary power-switching information. When the controller 106 is configured with a CPU, for example, the CPU in a waiting mode receives the auxiliary power switching information to execute the mode setting module included in the control program 315, thereby starting the mode setting process. In this way, the recording apparatus 300 determines its use based on whether or not it has been moved and sets the recording mode compatible with the determined use in the set mode information 112.

Next, a recording process to be performed by the recording apparatus 300 will be explained with respect to FIG. 15. The recording process starts when the recording start button is depressed while the recording apparatus 300 is being in the power turned-on mode with the auxiliary power button and then the input unit 302 outputs the recording start information. When the controller 106 is configured with a CPU, on receiving the recording start information, the CPU executes the recording control module included in the control program 315 to start the recording process.

Figure 15:
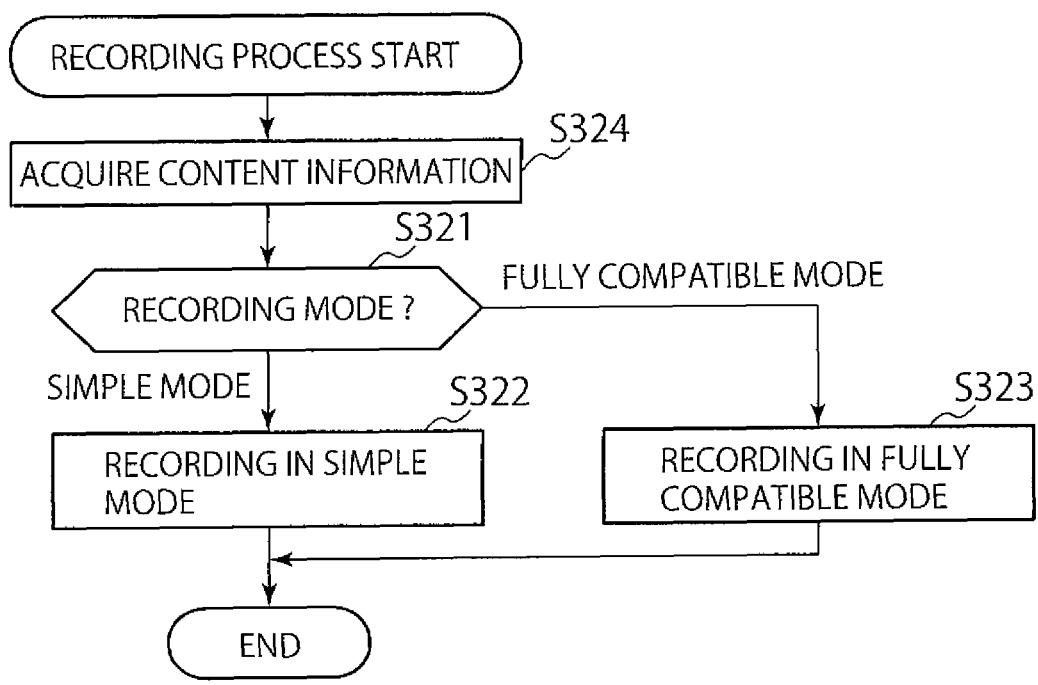
FIG. 15 is a flowchart showing a recording process performed by the recording apparatus according to the third embodiment.

As shown in FIG. 15, the content acquisition unit 375 receives a digital broadcast at a channel selected by a user and acquires content data (step S324).

Then, the set-mode determination unit 339 acquires the set mode information 112 stored in the set-mode information storage unit 122 and determines whether the recording mode indicated by the acquired set mode information 112 is the simple mode or the fully compatible mode (step S321). If it is determined that the recording mode indicated by the set mode information 112 is the simple mode (step S321: simple mode), the recording unit 376 looks up the mode definition information 111 corresponding to the simple mode, thereby recording the content data on the BD 116 in the simple mode (step S322). On the other hand, if it is determined that the recording mode indicated by the set mode information 112 is the fully compatible mode (step S321: fully compatible mode), the recording unit 376 looks up the mode definition information 111 corresponding to the fully compatible mode, thereby recording the content data on the BD 116 in the fully compatible mode (step S323). When the input receiving unit 338 receives the recording halt information based on a user operation, the recording process ends.

As described above, according to the third embodiment, the use of the recording apparatus 300 can be determined in the same manner as the first embodiment. Moreover, with the recording process shown in FIG. 15, content data can be recorded on the BD 116 in the recording mode that is set in the recording apparatus 300 and compatible with the use of the recording apparatus 300. Therefore, when the recording apparatus 300 is for the stationary use, a user can record content data on the BD 116 in the fully compatible mode in conformity with major profiles and enjoy the recorded content data. On the contrary, when the recording apparatus 300 is for the portable use, content data is recorded on the BD 116 in the simple mode with functions more restricted than the fully compatible mode. Therefore, the recording can be performed easily even if firmware is not often updated and the performance of hardware of the recording apparatus 300 is not high.

Explained in the third embodiment is the recording apparatus 300 for recording content data of a digital broadcast on the BD 116, however, not limited thereto. Content data to be recorded on the BD 116 may, for example, be content data stored on a storage medium such as an optical disc and a flash memory. In this case, the recording apparatus 300 may be provided with a reader unit, instead of the receiver unit 372, for reading content data stored on a storage medium. With such means, it is possible to record content data offered by various means on the BD 116, compatible with the use of the recording apparatus 300.

(Fourth Embodiment)

A recording apparatus will be explained with reference to the drawings, according to a fourth embodiment of the present invention.

A recording apparatus 400 according to the fourth embodiment is an apparatus for recording content data of a digital broadcast on a BD as a storage medium. In the same manner as the second embodiment, the recording apparatus 400 determines the use based on whether or not vibration in accordance with the movement of the recording apparatus 400 is detected, in addition to the determination of whether or not it has been moved for a predetermined period of time and records content data on a BD in a recording mode in accordance with the determined use.

Figure 16:
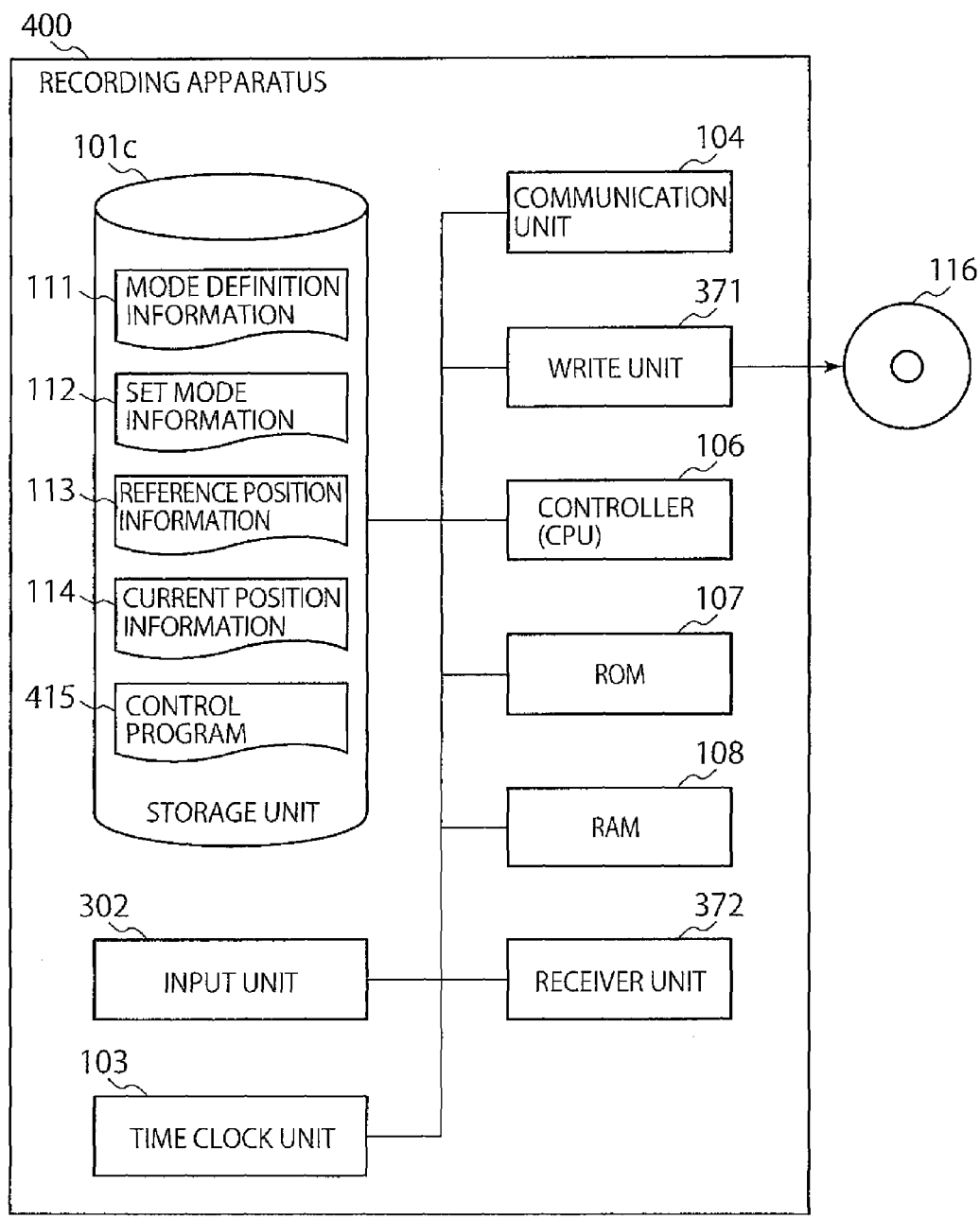
FIG. 16 shows a block diagram of a recording apparatus according to a fourth embodiment of the present invention.

FIG. 16 shows a block diagram of the recording apparatus 400 of the fourth embodiment. The recording apparatus 400 has a feature in that there are a storage unit 101c storing a control program 415, instead of the storage unit 101b shown in FIG. 13, the other units are analogous to or the same as those shown in FIG. 13.

The control program 415 is a software program including an initial setting module and a recording control module. The initial setting module is a software program for initial setting in order to determine the use of the recording apparatus 400, in the same manner as the second embodiment. The mode setting module includes a software program for determining the use of the recording apparatus 400 based on whether the recording apparatus 400 has been moved for a predetermined period of time and on whether vibration due to the movement of the recording apparatus 400 is detected and for setting a recording mode corresponding to the determined use of the recording apparatus 400.

As the use of the recording apparatus 400, there are a stationary use and a portable use, and information is set as the mode definition information 111 that are the fully compatible mode suitable for the stationary use and the contents of the fully compatible mode, and the simple mode suitable for the portable use and the contents of the simple mode, in the same manner as the third embodiment.

In the same manner as the second embodiment, the recording apparatus 400 starts an initial setting process shown in FIG. 9 whenever the auxiliary power button is depressed while power is being turned on with the main power button and the input unit 102 outputs the auxiliary power-switching information. When the controller 106 is configured with a CPU, for example, the CPU in a waiting mode receives the auxiliary power switching information to execute the initial setting module included in the control program 415, thereby starting the initial setting process shown in FIG. 9.

Figure 17:
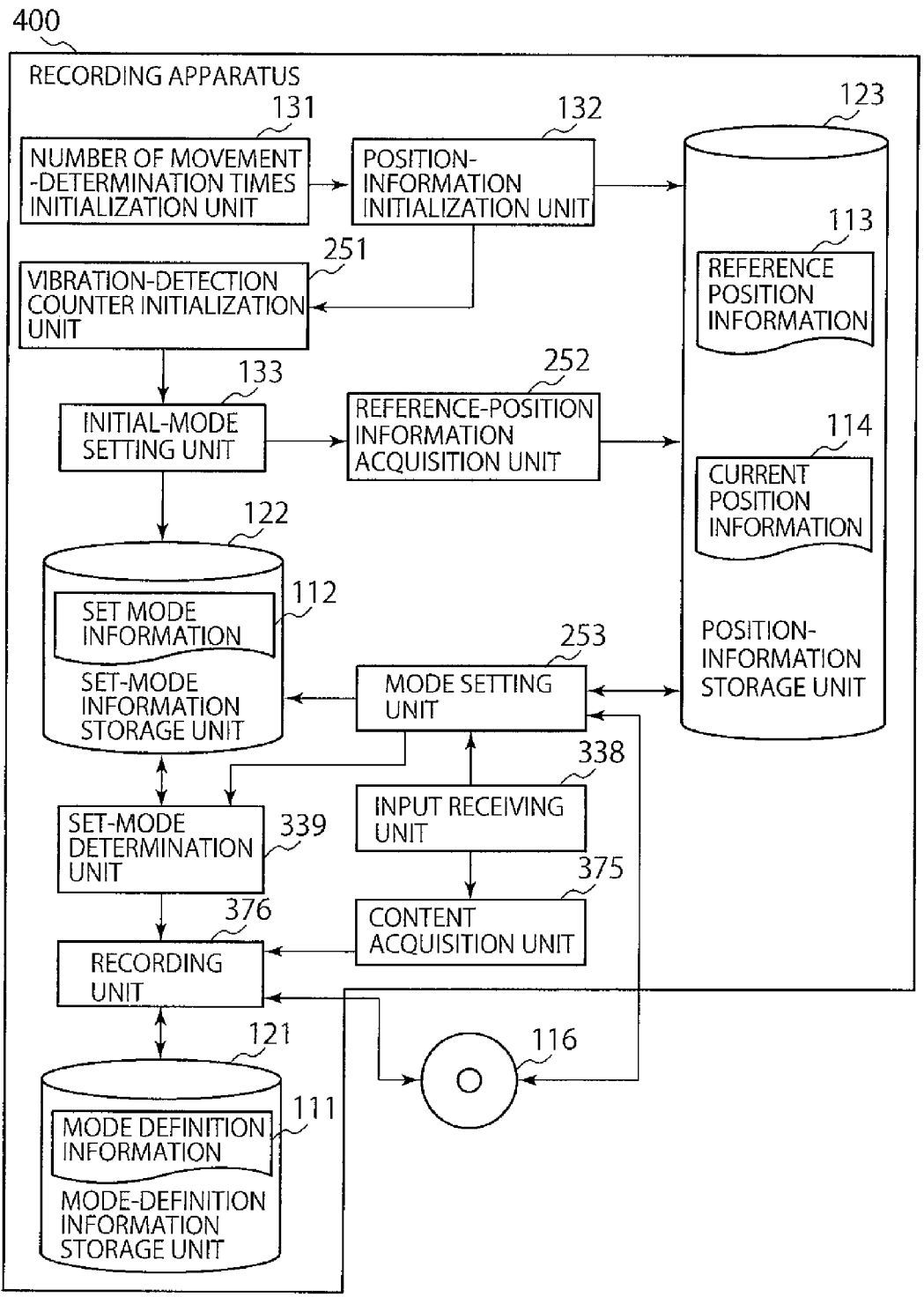
FIG. 17 shows a detailed block diagram of the recording apparatus according to the fourth embodiment.

FIG. 17 shows a detailed block diagram of the recording apparatus 400 of the fourth embodiment. In FIG. 16, when the controller 106 is configured with a CPU, the CPU cooperates with the storage unit 101c, the input unit 302, the time clock unit 103, the communication unit 104, the write unit 371, the ROM 107, the RAM 108, and the receiver unit 372 to execute the control program 315 to achieve various functions corresponding to the various units shown in FIG. 17. As shown in FIG. 17, the recording apparatus 400 of the fourth embodiment is configured with the various units of the first to the third embodiments shown in FIGS. 2, 7, and 14.

Next, a recording process to be performed by the recording apparatus 400 will be explained with respect to FIG. 18. The recording process starts when the recording start button is depressed while the recording apparatus 400 is being in the power turned-on mode with the auxiliary power button and then the input unit 302 outputs the recording start information. When the controller 106 is configured with a CPU, on receiving the recording start information, the CPU executes the recording control module included in the control program 415 to start the recording process.

Figure 18:
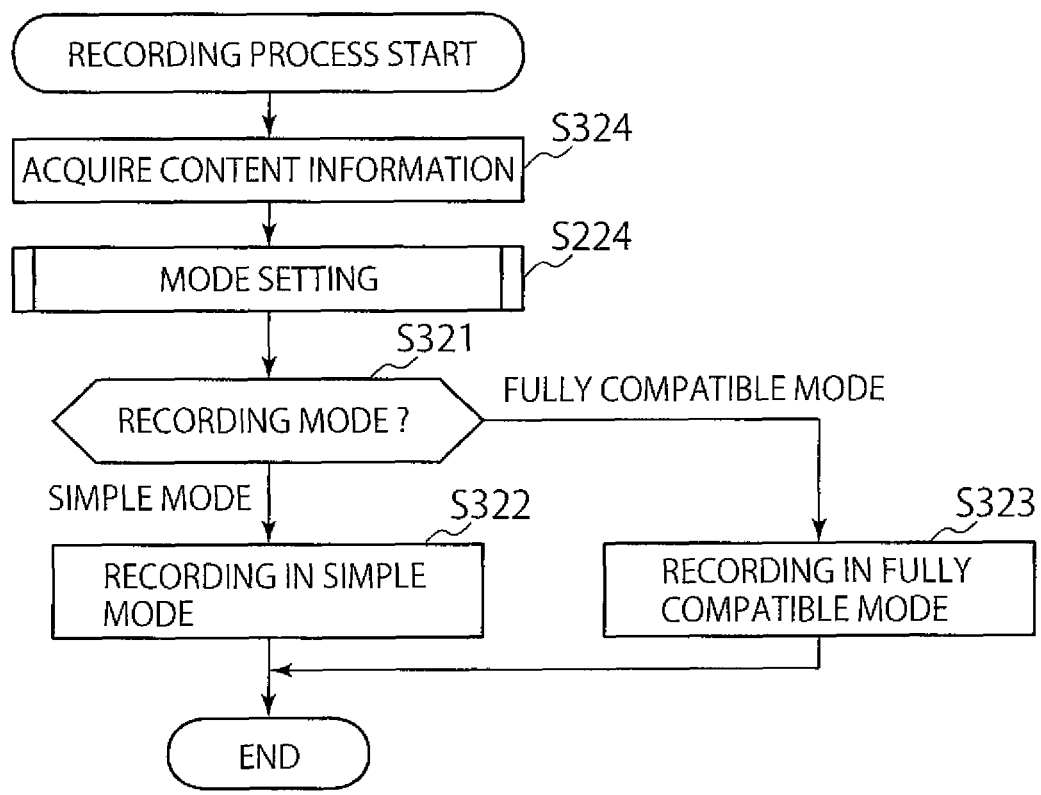
FIG. 18 is a flowchart showing a recording process performed by the recording apparatus according to the fourth embodiment.

As shown in FIG. 18, the content acquisition unit 375 performs the content data acquisition step S324 (FIG. 15). Then, the mode setting unit 253 performs the mode setting step S224 (FIG. 10). Thereafter, the set-mode determination unit 339 performs the mode determination step S321 (FIG. 15). Then, based on the mode determination, the recording unit 376 performs the recording step S322 or S323 (FIG. 15) in the simple mode or the fully compatible mode. When the input receiving unit 338 receives the recording halt information based on a user operation, the recording process ends.

As described above, according to the fourth embodiment, the use of the recording apparatus 400 is determined based on the vibration and movement detection, hence the use can be determined more accurately than the third embodiment.

As described above in detail, the present invention provides a reproduction apparatus, a mode setting apparatus, and a reproduction method, capable of determining the use thereof.

It is further understood by those skilled in the art that the foregoing description is a preferred embodiment of the disclosed device or method and that various changes and modifications may be made in the invention without departing from the sprit and scope thereof.

What is claimed is:

1. A reproduction apparatus comprising:
    a position-information acquisition unit configured to acquire first position information indicating a position at a first time and second position information indicating a position at a second time that is later than the first time;
    a movement determination unit configured to compare the first position information and the second position information to determine whether or not the reproduction apparatus is moved;
    a reproduction unit configured to reproduce information stored in a recording medium in a first mode if it is determined that the reproduction apparatus is moved and to reproduce the information stored in the recording medium in a second mode different from the first mode if it is determined that the reproduction apparatus is not moved, the first mode being a reproduction mode having functions for use in reproduction more restricted than the second mode; and
    a vibration determination unit configured to determine whether or not vibration occurs based on a signal related to vibration, wherein the reproduction unit reproduces the information stored in the recording medium in the first mode when at least either one of a first case and a second case is established, the first case being a case in which the movement determination unit determines that the reproduction apparatus is moved and the second case being a case in which the vibration determination unit determines that vibration occurs, and reproduces the information stored in the recording medium in the second mode when both of a third case and a fourth case are established, the third case being a case in which the movement determination unit determines that the reproduction apparatus is not moved and the fourth case being a case in which the vibration determination unit determines that vibration does not occur.

2. The reproduction apparatus according to claim 1, wherein the positions indicated by the first and second position information are positions of terminal equipment that communicates with the reproduction apparatus within a range of distance that is determined so that the positions of the terminal equipment can be treated as positions of the reproduction apparatus.

3. The reproduction apparatus according to claim 1, wherein the first position information indicates a position that is located at the first time using a wireless communication system and the second position information indicates a position that is located at the second time using the wireless communication system.

4. The reproduction apparatus according to claim 1, wherein the first position information is image information indicating an image that is captured by an imaging device at the first time and the second position information is image information indicating an image that is captured by the imaging device at the second time.

5. The reproduction apparatus according to claim 1 further comprising a storage unit configured to store mode definition information that defines the first mode and the second mode, as the reproduction mode, wherein the movement determination unit looks up the mode definition information to set the first mode as the reproduction mode when it is determined that the reproduction apparatus is moved and to set the second mode as the reproduction mode when it is determined that the reproduction apparatus is not moved.

6. A reproduction apparatus comprising:
a position-information acquisition unit configured to acquire first position information indicating a position at a first time and second position information indicating a position at a second time that is later than the first time;
a movement determination unit configured to compare the first position information and the second position information to determine whether or not the reproduction apparatus is moved;
a reproduction unit configured to reproduce information stored in a recording medium in a first mode if it is determined that the reproduction apparatus is moved and to reproduce the information stored in the recording medium in a second mode different from the first mode if it is determined that the reproduction apparatus is not moved, the first mode being a reproduction mode having functions for use in reproduction more restricted than the second mode;
a storage unit configured to store mode definition information that defines the first mode and the second mode, as the reproduction mode, wherein the movement determination unit looks up the mode definition information to set the first mode as the reproduction mode when it is determined that the reproduction apparatus is moved and to set the second mode as the reproduction mode when it is determined that the reproduction apparatus is not moved; and
a vibration determination unit configured to determine whether or not vibration occurs based on a signal related to vibration, wherein the mode definition information is looked up to set the first mode as the reproduction mode when at least either one of a first case and a second case is established, the first case being a case in which the movement determination unit determines that the reproduction apparatus is moved and the second case being a case in which the vibration determination unit determines that vibration occurs, and to set the second mode as the reproduction mode when both of a third case and a fourth case are established, the third case being a case in which the movement determination unit determines that the reproduction apparatus is not moved and the fourth case being a case in which the vibration determination unit determines that vibration does not occur.

7. A mode setting apparatus comprising:
a storage unit configured to store mode definition information that defines a first mode and a second mode that has more functions than the first mode, as a control mode;
a position-information acquisition unit configured to acquire first position information indicating a position at a first time and second position information indicating a position at a second time that is later than the first time; and
a mode setting unit configured to set the first mode or the second mode as the control mode based on determination using the first and second position information;
wherein the mode setting unit includes a movement determination unit configured to compare the first position information and the second position information to determine whether or not the mode setting apparatus is moved and to look up the mode definition information, wherein the mode setting unit sets the first mode as the control mode when it is determined that the mode setting apparatus is moved and sets the second mode as the control mode when it is determined that the mode setting apparatus is not moved; and
wherein the mode setting unit includes a vibration determination unit configured to determine whether or not vibration occurs based on a signal related to vibration, wherein the mode setting unit sets the first mode as the control mode when at least either one of a first case and a second case is established, the first case being a case in which the movement determination unit determines that the mode setting apparatus is moved and the second case being a case in which the vibration determination unit determines that vibration occurs, and sets the second mode as the control mode when both of a third case and a fourth case are established, the third case being a case in which the movement determination unit determines that the mode setting apparatus is not moved and the fourth case being a case in which the vibration determination unit determines that vibration does not occur.

8. The mode setting apparatus according to claim 7, wherein the positions indicated by the first and second position information are positions of terminal equipment that communicates with the mode setting apparatus within a range of distance that is determined so that the positions of the terminal equipment can be treated as positions of the reproduction apparatus.

9. The mode setting apparatus according to claim 7, wherein the first position information indicates a position that is located at the first time using a wireless communication system and the second position information indicates a position that is located at the second time using the wireless communication system.

10. The mode setting apparatus according to claim 7, wherein the first position information is image information indicating an image that is captured by an imaging device at the first time and the second position information is image information indicating an image that is captured by the imaging device at the second time.

11. A reproduction method to be used for a reproduction apparatus comprising the steps of:

acquiring first position information indicating a position at a first time and second position information indicating a position at a second time that is later than the first time;

comparing the first position information and the second position information to determine whether or not the reproduction apparatus is moved;

reproducing information stored in a recording medium in a first mode if it is determined that the reproduction apparatus is moved and reproducing the information stored in the recording medium in a second mode different from the first mode if it is determined that the reproduction apparatus is not moved, the first mode being a reproduction mode having functions for use in reproduction more restricted than the second mode; and determining whether or not vibration occurs based on a signal related to vibration, wherein the information stored in the recording medium is reproduced in the first mode when at least either one of a first case and a second case is established, the first case being a case in which it is determined that the reproduction apparatus is moved and the second case being a case in which it is determined that vibration occurs, and the information stored in the recording medium is reproduced in the second mode when both of a third case and a fourth case are established, the third case being a case in which it is determined that the reproduction apparatus is not moved and the fourth case being a case in which it is determined that vibration does not occur.

12. The reproduction method according to claim 11, wherein the positions indicated by the first and second position information are positions of terminal equipment that communicates with the reproduction apparatus within a range of distance that is determined so that the positions of the terminal equipment can be treated as positions of the reproduction apparatus.

13. The reproduction method apparatus according to claim 11, wherein the first position information indicates a position that is located at the first time by wireless communication and the second position information indicates a position that is located at the second time by the wireless communication.

14. The reproduction method according to claim 11, wherein the first position information is image information indicating an image that is captured by an imaging device at the first time and the second position information is image information indicating an image that is captured by the imaging device at the second time.

15. The reproduction apparatus according to claim 11 further comprising the step of storing mode definition information that defines the first mode and the second mode, as the reproduction mode, wherein the mode definition information is looked up to set the first mode as the reproduction mode when it is determined that the reproduction apparatus is moved and to set the second mode as the reproduction mode when it is determined that the reproduction apparatus is not moved.

16. A reproduction method to be used for a reproduction apparatus comprising the steps of:

acquiring first position information indicating a position at a first time and second position information indicating a position at a second time that is later than the first time;

comparing the first position information and the second position information to determine whether or not the reproduction apparatus is moved; and reproducing information stored in a recording medium in a first mode if it is determined that the reproduction apparatus is moved and reproducing the information stored in the recording medium in a second mode different from the first mode if it is determined that the reproduction apparatus is not moved, the first mode being a reproduction mode having functions for use in reproduction more restricted than the second mode;

storing mode definition information that defines the first mode and the second mode, as the reproduction mode, wherein the mode definition information is looked up to set the first mode as the reproduction mode when it is determined that the reproduction apparatus is moved and to set the second mode as the reproduction mode when it is determined that the reproduction apparatus is not moved; and determining whether or not vibration occurs based on a signal related to vibration, wherein the mode definition information is looked up to set the first mode as the reproduction mode when at least either one of a first case and a second case is established, the first case being a case in which it is determined that the reproduction apparatus is moved and the second case being a case in which it is determined that vibration occurs, and to set the second mode as the reproduction mode when both of a third case and a fourth case are established, the third case being a case in which it is determined that the reproduction apparatus is not moved and the fourth case being a case in which it is determined that vibration does not occur.

* * * * *